United States Patent
Minami et al.

(10) Patent No.: US 10,046,308 B2
(45) Date of Patent: Aug. 14, 2018

(54) PRODUCTION METHOD OF OXYGEN STORAGE MATERIAL

(71) Applicant: TOYOTA JIDOSHA KABUSHIKI KAISHA, Toyota-shi, Aichi-ken (JP)

(72) Inventors: Takashi Minami, Toyota (JP); Satoshi Nagao, Gotenba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 71 days.

(21) Appl. No.: 15/342,665

(22) Filed: Nov. 3, 2016

(65) Prior Publication Data

US 2017/0151551 A1    Jun. 1, 2017

(30) Foreign Application Priority Data

Nov. 27, 2015   (JP) .................. 2015-232276

(51) Int. Cl.
*B01J 23/10* (2006.01)
*B01J 37/03* (2006.01)
(Continued)

(52) U.S. Cl.
CPC .............. *B01J 23/10* (2013.01); *B01D 53/94* (2013.01); *B01D 53/945* (2013.01);
(Continued)

(58) Field of Classification Search
CPC . B01J 23/10; B01J 23/83; B01J 37/036; B01J 35/0013; B01J 37/12; B01J 23/002;
(Continued)

(56) References Cited

U.S. PATENT DOCUMENTS

| 6,040,265 A | 3/2000 | Nunan |
| 2003/0050189 A1 | 3/2003 | Morikawa et al. |
| 2015/0375202 A1 | 12/2015 | Nagao et al. |

FOREIGN PATENT DOCUMENTS

| EP | 1287876 A2 | 3/2003 |
| EP | 2924009 A1 | 9/2015 |

(Continued)

OTHER PUBLICATIONS

Haruo Kishimoto et al. "Crystal Structure of Metastable K-CeZrO4 Phase Possessing an Ordered Arrangement of Ce and Zr Ions". Journal of Alloys and Compounds, vol. 312, 2000, pp. 94-103.

*Primary Examiner* — Anthony J Zimmer
(74) *Attorney, Agent, or Firm* — Oliff PLC

(57) ABSTRACT

A production method comprising: adding a hydroxycarboxylic acid to an aqueous solution containing a Ce salt, a Zr salt, an Al salt, and at least one selected from a La salt, an Mg salt, and a Ca salt, to produce a gel, heating the gel to obtain a solid product by decomposition of the salts, firing the solid product to obtain a fired product containing a ceria-zirconia-based regular array phase precursor and an aluminate-based composite oxide precursor, performing a reducing heat treatment of the fired product to obtain a first composite having mutually dispersed therein a pyrochlore phase and an aluminate-based composite oxide, and performing an oxidizing heat treatment of the first composite to obtain a second composite in which at least part of the pyrochlore phase is transformed into a κ phase; and an oxygen storage material having mutually dispersed therein the composite oxide and the regular array phase.

7 Claims, 12 Drawing Sheets

(51) Int. Cl.
- *B01J 37/08* (2006.01)
- *B01J 37/16* (2006.01)
- *B01J 37/12* (2006.01)
- *B01J 37/00* (2006.01)
- *B01D 53/94* (2006.01)
- *B01J 35/00* (2006.01)
- *B01J 23/00* (2006.01)
- *B01J 23/63* (2006.01)
- *B01J 23/83* (2006.01)
- *B01J 35/02* (2006.01)

(52) U.S. Cl.
CPC ............ *B01J 23/002* (2013.01); *B01J 23/63* (2013.01); *B01J 23/83* (2013.01); *B01J 35/002* (2013.01); *B01J 35/0013* (2013.01); *B01J 35/023* (2013.01); *B01J 37/036* (2013.01); *B01J 37/08* (2013.01); *B01J 37/088* (2013.01); *B01J 37/12* (2013.01); *B01J 37/16* (2013.01); *B01D 2255/2065* (2013.01); *B01D 2255/2092* (2013.01); *B01D 2255/20715* (2013.01); *B01D 2255/407* (2013.01); *B01J 2523/00* (2013.01)

(58) Field of Classification Search
CPC ........ B01J 37/08; B01J 35/023; B01J 35/002; B01J 37/088; B01J 23/63; B01J 37/16; B01J 2523/00; B01D 53/94; B01D 53/945; B01D 2255/407; B01D 2255/2065; B01D 2255/20715; B01D 2255/2092

See application file for complete search history.

(56) References Cited

FOREIGN PATENT DOCUMENTS

| | | |
|---|---|---|
| JP | H11-165067 A | 6/1999 |
| JP | H11-165076 A | 6/1999 |
| JP | 2003-073123 A | 3/2003 |
| JP | 2009-084061 A | 4/2009 |
| JP | 2016-008168 A | 1/2016 |

EXAMPLE 1  2MgAl2O4+Ce0.7La1.3Zr2O7.35

EXAMPLE 6  2LaAl+Ce1.2La0.8Zr2O7.3

EXAMPLE 7  2CaAl4O7+Ce2Zr2O8

EXAMPLE 8  2MgAl2O4+Ce2Zr2O8

EXAMPLE 9  2MgAl2O4+Ce0.7La1.3Zr2OX

FFT  DIFFRACTION SIMULATION

FFT  DIFFRACTION SIMULATION

FFT  DIFFRACTION SIMULTION

FFT   DIFFRACTION SIMULTION

PRODUCTION METHOD OF OXYGEN STORAGE MATERIAL

TECHNICAL FIELD

The present invention relates to a production method of an oxygen storage material, and an oxygen storage material. More specifically, the present invention relates to a production method of an oxygen storage material suitably used, e.g., in a purification catalyst for an exhaust gas discharged from an internal combustion engine of automobiles, etc., and an oxygen storage material.

BACKGROUND ART

In an exhaust gas discharged from an internal combustion engine of automobiles, etc., nitrogen oxide ($NO_x$), carbon monoxide (CO), hydrocarbon (HC), etc. are contained, and these substances can be removed by an exhaust gas purification catalyst of oxidizing CO and HC and reducing $NO_x$. As a representative exhaust gas purification catalyst of this type, a three-way catalyst obtained by supporting a noble metal such as platinum (Pt), rhodium (Rh) and/or palladium (Pd), on a porous metal oxide support such as γ-alumina is known.

The metal oxide support may be formed of various materials, but alumina is generally used. However, in recent years, in order to accelerate the purification of exhaust gas by utilizing a chemical property of the support, it has been proposed to use various other materials such as ceria ($CeO_2$), zirconia ($ZrO_2$) and/or titania ($TiO_2$) in combination or not in combination with alumina.

For example, in order to enhance the exhaust gas purifying ability of the three-way catalyst by absorbing the fluctuation of oxygen concentration in the exhaust gas, a material having an oxygen storage capacity (OSC) of storing oxygen when the oxygen concentration in the exhaust gas is high, and releasing oxygen when the oxygen concentration in the exhaust gas is low, is used for an exhaust gas purification catalyst. A representative material having oxygen storage capacity is ceria.

For achieving efficient progress of oxidation of CO and HC and reduction of $NO_x$ by the action of a three-way catalyst, the air-fuel ratio of an internal combustion engine needs to be a theoretical air-fuel ratio (stoichiometric ratio), and therefore maintaining the oxygen concentration around the theoretical air-fuel ratio by causing a material having an oxygen storage capacity to absorb the fluctuation of oxygen concentration in the exhaust gas is preferred in order for the three-way catalyst to exert the exhaust gas purifying ability. Furthermore, according to recent studies, it has been found that ceria has not only an oxygen storage capacity but also strong affinity for a noble metal, particularly platinum, supported thereon, and therefore can suppress the grain growth (sintering) of the noble metal.

Thus, ceria has a preferable property with respect to use in an exhaust gas purification catalyst but sometimes does not have heat resistance required in this application. Accordingly, it has been proposed to form a ceria-zirconia-based composite oxide by dissolving ceria and zirconia in solid and thereby enhance the heat resistance.

For example, Patent Document 1 discloses an oxygen storage material containing a ceria-zirconia-based composite oxide, wherein a pyrochlore-type regular array phase (hereinafter, referred to as "ceria-zirconia-based regular array phase") is formed by a cerium ion and a zirconium ion in the ceria-zirconia-based composite oxide.

The ceria-zirconia-based regular array phase is a pyrochlore phase in a reduced state and a κ phase in an oxidized state. The pyrochlore phase has an oxygen-deficient site and, upon introduction of an oxygen atom into the site, the pyrochlore phase transforms into a κ phase. On the other hand, the κ phase transforms into the pyrochlore phase by releasing the oxygen atom. The oxygen storage capacity of the ceria-zirconia composite oxide is realized by absorbing and releasing oxygen during reciprocal phase transformation between the pyrochlore phase and the κ phase.

In the case of using a ceria-zirconia-based composite oxide as an oxygen storage material for an exhaust gas catalyst, the ceria-zirconia-based regular array phase formed in the ceria-zirconia-based composite oxide transforms into a pyrochlore phase in a fuel-rich state and turns into a κ phase in a fuel-lean state. Such a phase transformation is produced by the entering and leaving of oxygen in the surface of the ceria-zirconia-based regular array phase.

When the particle diameter of the ceria-zirconia-based regular array phase is large, oxygen can hardly enter and leave the inside of the ceria-zirconia-based regular array phase. As a result, the oxygen storage speed of the ceria-zirconia-based regular array phase lowers, and the oxygen storage temperature rises.

CITATION LIST

Patent Literature

[Patent Document 1] Japanese Unexamined Patent Publication No. 2009-84061

SUMMARY OF THE INVENTION

Problems to be Solved by the Invention

According to Patent Document 1, the average particle diameter of the ceria-zirconia-based regular array phase is large and from 0.1 to 8 μm. Because, the ceria-zirconia-based regular array phase of the oxygen storage material disclosed in Patent document 1 is produced by reducing and firing a composite oxide powder of ceria and zirconia at a high temperature of 1,500° C. or more.

The present inventors have found that the ceria-zirconia-based regular array phase obtained by reducing and firing a composite oxide powder of ceria and zirconia at a high temperature of 1,500° C. or more is disadvantageously not sufficient in the oxygen storage capacity because of its large particle diameter.

The present invention has been made to solve the problems above, and an object of the present invention is to provide a production method of an oxygen storage material, where the particle diameter of the ceria-zirconia-based regular array phase is inhibited from becoming large. Another object of the present invention is to provide an oxygen storage material of which oxygen storage capacity is enhanced by inhibiting the particle diameter of the ceria-zirconia-based regular array phase from becoming large.

Means to Solve the Problems

The present inventors have made many intensive studies to attain the objects above and have accomplished the present invention. The gist thereof is as follows.

<1> A production method of an oxygen storage material, comprising:
adding a hydroxycarboxylic acid to an aqueous solution containing a water-soluble cerium salt, a water-soluble zirconium salt, a water-soluble aluminum salt, and at least one selected from a water-soluble lanthanum salt, a water-soluble magnesium salt, and a water-soluble calcium salt, to produce a gel,
heating the gel to obtain a solid product resulting from decomposition of the salts,
firing the solid product to obtain a fired product containing a ceria-zirconia-based regular array phase precursor and an aluminate-based composite oxide precursor,
performing a reducing heat treatment of the fired product to obtain a first composite having mutually dispersed therein a pyrochlore phase and an aluminate-based composite oxide, and
performing an oxidizing heat treatment of the first composite to obtain a second composite in which at least part of the pyrochlore phase is transformed into a κ phase.

<2> The production method of an oxygen storage material according to item <1>, wherein the firing of a solid product includes:
preliminary firing the solid product at a temperature allowing an inorganic material in the solid product to remain, thereby obtaining a preliminary fired product, and
re-firing the preliminary fired product in an inert gas atmosphere to obtain a re-fired product containing a ceria-zirconia-based regular array phase precursor, an aluminate-based composite oxide precursor, and a carbide derived from the organic material, followed by subjecting the re-fired product to the reducing heat treatment.

<3> The production method of an oxygen storage material according to item <1>, wherein the reducing heat treatment comprises:
adding a hydroxycarboxylic acid and water to the fired product to obtain a mixed solution,
drying the mixed solution to obtain a dried body,
calcining the dried body at a temperature allowing an inorganic material in the dried body to remain, thereby obtaining a calcined product, and
re-firing the calcined product in an inert gas atmosphere to obtain a fired product containing the ceria-zirconia-based regular array phase precursor, the aluminate-based composite oxide precursor, and the organic material-derived carbide.

<4> The production method of an oxygen storage material according to any one of items <1> to <3>, wherein a re-oxidizing heat treatment is further performed after the oxidizing heat treatment.

<5> The production method of an oxygen storage material according to any one of items <1> to <4>, wherein the salt is a nitrate.

<6> The production method of an oxygen storage material according to any one of items <1> to <5>, wherein the hydroxycarboxylic acid is a citric acid.

<7> The production method of an oxygen storage material according to any one of items <1> to <6>, further comprising supporting one or more metals selected from ruthenium, rhodium, palladium, osmium, iridium, platinum, gold, copper, iron and nickel on the second composite.

<8> An oxygen storage material,
wherein a ceria-zirconia-based regular array phase with at least part being a κ phase and an aluminate-based composite oxide are mutually dispersed, and
wherein the average particle diameter in a direction perpendicular to (222) measured by X-ray diffraction of the ceria-zirconia-based regular array phase is from 8.5 to 33 nm.

<9> The oxygen storage material according to item <8>, wherein the average particle diameter is from 18 to 25 nm.

Effects of the Invention

According to the present invention, a production method of an oxygen storage material, where the particle diameter of the ceria-zirconia-based regular array phase is inhibited from becoming large, can be provided. In addition, an oxygen storage material of which oxygen storage capacity is enhanced by inhibiting the particle diameter of the ceria-zirconia-based regular array phase from becoming large, can be provided.

EMBODIMENTS FOR CARRYING OUT THE INVENTION

Figure 1:
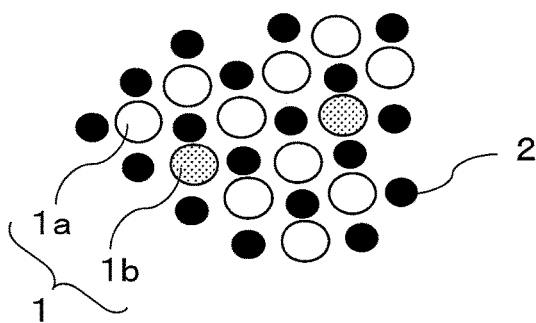
[FIG. 1] A schematic view illustrating the microstructure of an oxygen storage material obtained by the production method of the present invention.
Figure 2A:
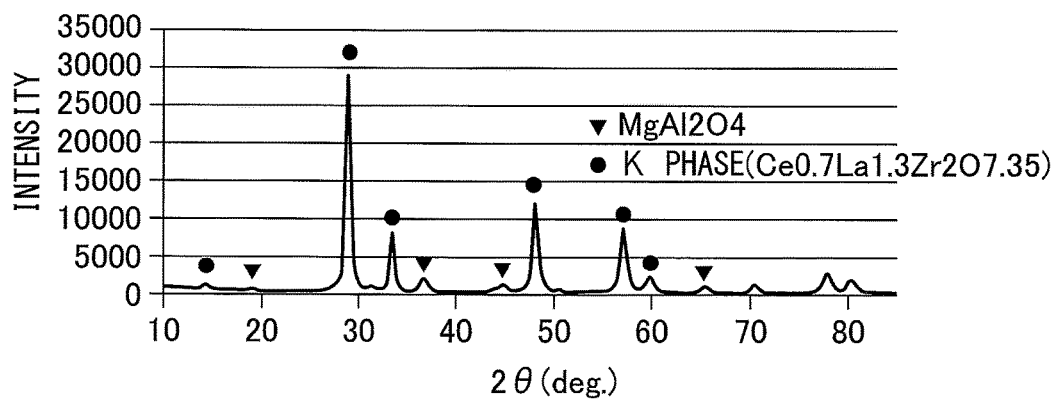
[FIG. 2A] A view illustrating an X-ray diffraction pattern of the oxygen storage material of Example 1.
Figure 2B:
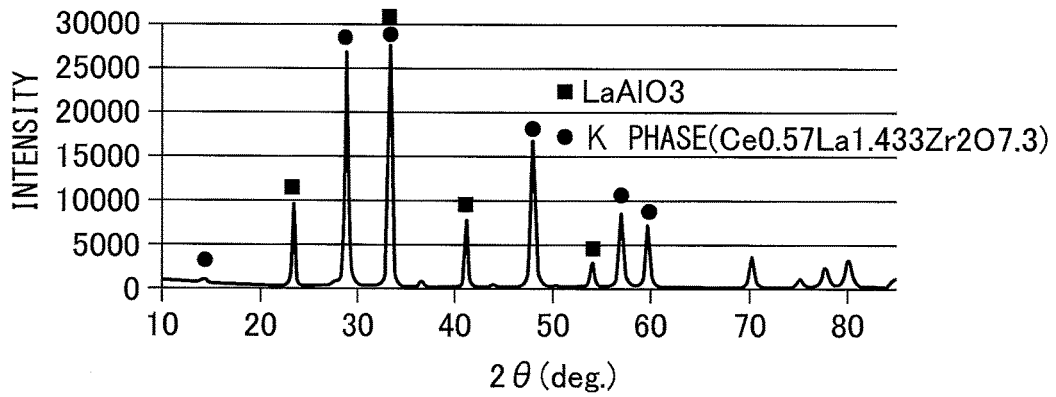
[FIG. 2B] A view illustrating an X-ray diffraction pattern of the oxygen storage material of Example 6.
Figure 2C:
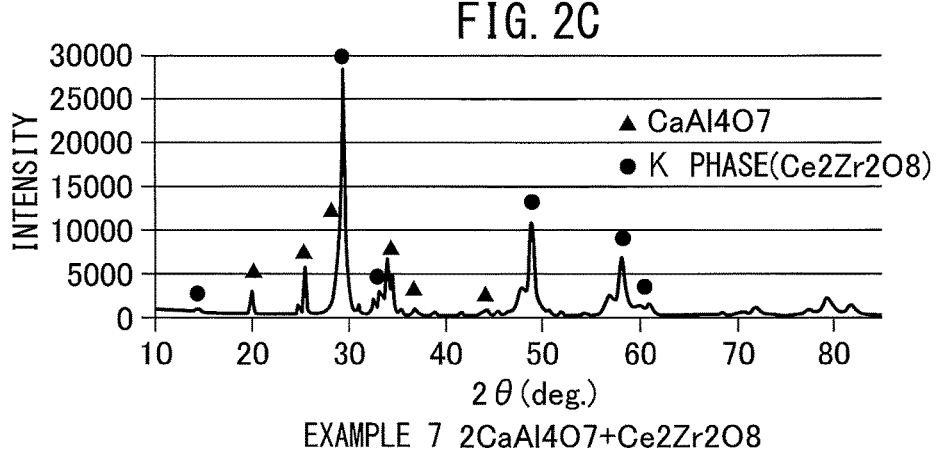
[FIG. 2C] A view illustrating an X-ray diffraction pattern of the oxygen storage material of Example 7.
Figure 2D:
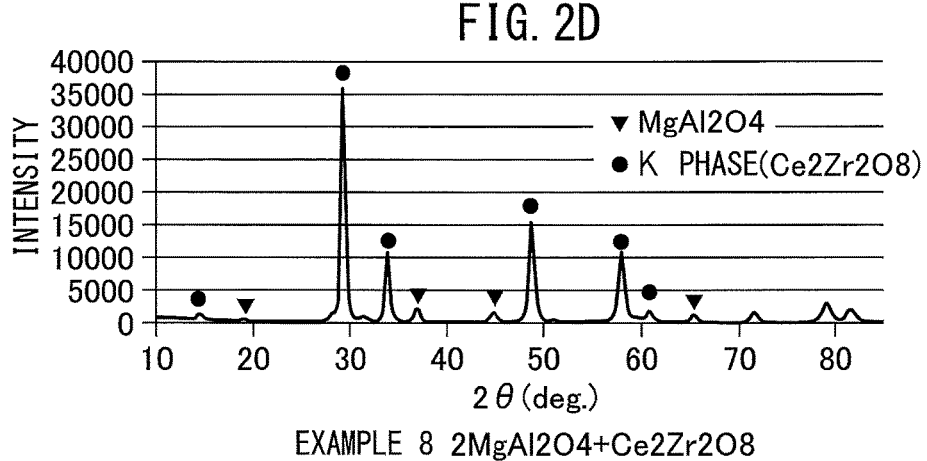
[FIG. 2D] A view illustrating an X-ray diffraction pattern of the oxygen storage material of Example 8.
Figure 2E:
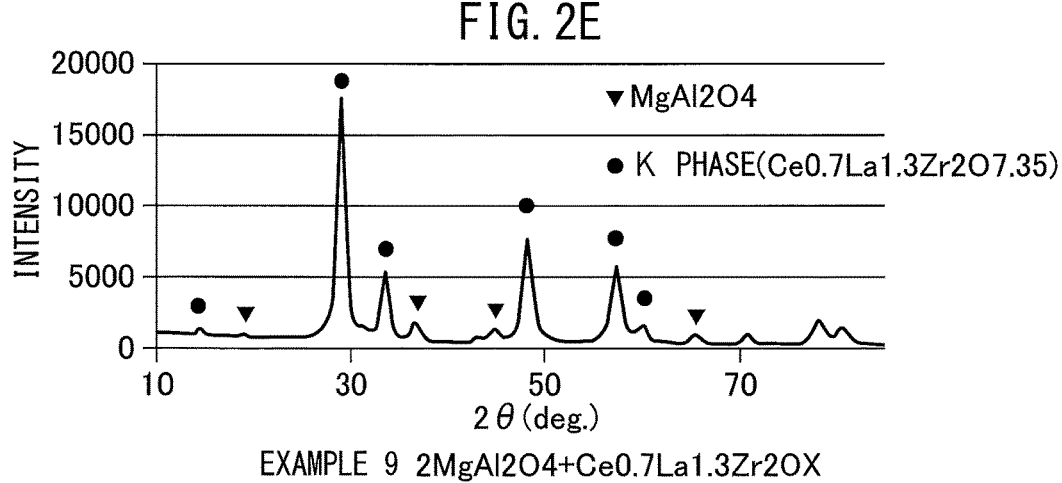
[FIG. 2E] A view illustrating an X-ray diffraction pattern of the oxygen storage material of Example 9.

The embodiments of the production method of an oxygen storage material, and the oxygen storage material according to the present invention are described in detail below. The present invention is not limited to the following embodiments.

First, the production method of an oxygen storage material according to the present invention is described.
(Production of Gel)

In the production method of an oxygen storage material according to the present invention, a gel is produced by adding a hydroxycarboxylic acid to an aqueous solution containing a water-soluble cerium (Ce) salt, a water-soluble zirconium (Zr) salt, a water-soluble aluminum (Al) salt, and at least one member selected from a water-soluble lanthanum (La) salt, a water-soluble magnesium (Mg) salt, and a water-soluble calcium (Ca) salt.

The water-soluble cerium salt and the water-soluble zirconium salt are raw materials of the ceria-zirconia-based regular array phase (pyrochlore phase, κ phase). In some cases, the water-soluble lanthanum salt becomes a raw material of the ceria-zirconia-based regular array phase. In this case, part of cerium in the ceria-zirconia-based regular array phase is replaced by lanthanum. Replacement by lanthanum makes it possible to maintain the ceria-zirconia-based regular array phase even in a high-temperature oxidizing atmosphere. In addition, part of zirconium may be replaced by yttrium (Y). Replacement by yttrium also makes it possible to maintain the ceria-zirconia-based regular array phase in a high-temperature oxidizing atmosphere.

The water-soluble magnesium salt and the water-soluble aluminum salt are raw materials of the aluminate-based composite oxide. In some cases, the water-soluble lanthanum salt becomes a raw material of the aluminate-based composite oxide.

With respect to blending of these raw materials, respective raw materials are blended such that each of the ceria-zirconia-based regular array phase and the aluminate-based composite oxide accounts for a desired proportion in the oxygen storage material.

Although details are described later, the ceria-zirconia-based regular array phase and the aluminate-based composite oxide are mutually dispersed at the nano-level in the oxygen storage material, whereby the ceria-zirconia-based regular array phase is inhibited from grain growth. Accordingly, as raw materials, at least one selected from a water-soluble lanthanum salt, a water-soluble magnesium salt, and a water-soluble calcium salt is blended with a water-soluble cerium salt, a water-soluble zirconium salt, and a water-soluble aluminum salt, and these salts are dissolved in water.

As for the blending ratio of the raw materials, the molar ratio represented by (molar number of aluminate-based composite oxide)/(molar number of ceria-zirconia-based regular array phase) (hereinafter, sometimes simply referred to as "molar ratio") is closely related to the average particle diameter in a direction perpendicular to (222) (hereinafter, referred to as "(222) average particle diameter") measured by X-ray diffraction of the ceria-zirconia-based regular array phase. When the raw materials are blended to provide a molar ratio of 0.5 or more, the (222) average particle diameter becomes 33 nm or less, and the grain growth-inhibiting action can be notably confirmed. When the raw materials are blended to provide a molar ratio of 1 or more, the (222) average particle diameter becomes 25 nm or less, and the grain growth-inhibiting action can be more notably confirmed. On the other hand, when the raw materials are blended to provide a molar ratio of 3 or less, while enjoying the particularly notable grain growth-inhibiting action, the relative amount of the ceria-zirconia-based composite oxide in the oxygen storage material is not decreased excessively.

The water-soluble cerium salt includes, for example, cerium nitrate, cerium ammonium nitrate, cerium chloride, and cerium sulfate. A hydrate thereof may also be used. Cerium nitrate and a hydrate thereof are typical.

The water-soluble zirconium salt includes, for example, zirconium oxynitrate, zirconium oxychloride, and zirconium oxyacetate. A hydrate thereof may also be used. Zirconium oxynitrate and a hydrate thereof are typical.

The water-soluble aluminum salt includes, for example, aluminum nitrate, aluminum chloride, and aluminum sulfate. A hydrate thereof may also be used. Aluminum nitrate and a hydrate thereof are typical.

The water-soluble lanthanum salt includes, for example, lanthanum nitrate, lanthanum ammonium nitrate, lanthanum chloride, and lanthanum sulfate. A hydrate thereof may also be used. Lanthanum nitrate and a hydrate thereof are typical.

The water-soluble magnesium salt includes, for example, magnesium nitrate, magnesium chloride, and magnesium sulfate. A hydrate thereof may also be used. Magnesium nitrate and a hydrate thereof are typical.

The water-soluble calcium salt includes, for example, calcium nitrate, calcium ammonium nitrate, calcium chloride, calcium sulfate, and a salt of calcium with magnesium and/or lanthanum. A hydrate thereof may also be used. Calcium nitrate and a hydrate thereof are typical. In the case of containing lanthanum in the water-soluble calcium salt, the water-soluble calcium salt may become a raw material of both the ceria-zirconia-based regular array phase and the aluminate composite oxide.

Other than the water-soluble salts described above, another water-soluble salt may be added within the range not impairing the effects of the present invention. Another water-soluble salt includes, for example, a water-soluble yttrium (Y) salt. The water-soluble yttrium salt becomes a raw material of the ceria-zirconium-based regular array phase.

The water-soluble yttrium salt includes, for example, yttrium nitrate, yttrium chloride, and yttrium sulfate. A hydrate thereof may also be used. Yttrium nitrate and a hydrate thereof are typical.

In the following description, it is meant that the element may contain an element derived from the water-soluble salt added within the range not impairing the effects of the present invention. For example, the "cerium, zirconium, aluminum and at least one selected from lanthanum, magnesium and calcium" means that these elements may contain an element derived from the water-soluble salt added within the range not impairing the effects of the present invention.

A gel is produced by adding a hydroxycarboxylic acid to an aqueous solution containing a water-soluble cerium salt, a water-soluble zirconium salt, a water-soluble aluminum salt, and at least one selected from a water-soluble lanthanum salt, a water-soluble magnesium salt, and a water-soluble calcium salt. The hydroxycarboxylic acid is not particularly limited as long as a gel can be produced, but includes, for example, a citric acid, a tartaric acid, and a lactic acid. A citric acid is typical.

(Heating of Gel)

The obtained gel is heated to obtain a solid product resulting from decomposition of the above-described salts. The solid product contains a compound containing at least one selected from lanthanum, magnesium and calcium, and a compound containing cerium, zirconium and aluminum. These compounds may be, for example, an oxide and/or a hydroxide.

The heating temperature may be appropriately determined according to the kind of the salt. In the case where the salt is a nitrate, the heating temperature is preferably 150 to 250° C. When the heating temperature is 150° C. or more, the nitrate can be decomposed. The heating temperature is more preferably 165° C. or more. On the other hand, when the heating temperature is 250° C. or less, decomposition of the nitrate and firing thereof do not occur simultaneously. As a result, a coarse fired product is not produced. The heating temperature is more preferably 200° C. or less. The same applies to the sulfate.

The heating time may be appropriately determined according to the amount of the gel. For example, the heating time may be 10 minutes or more, 20 minutes or more, or 25 minutes or more, and may be 5 hours or less, 1.5 hours or less, or 45 minutes or less.

After the heating for decomposing the salts, the remaining solid product may be put in an electric furnace, etc. and heater at 150 to 250° C. over 20 to 30 minutes, if desired, so as to dry the remaining solid product.

(Firing of Solid Product)

With respect to firing of the solid product, embodiment A and embodiment B are described here, but the firing is not limited thereto.

Embodiment A

In embodiment A, the solid product resulting from decomposition of the salts is fired, whereby a fired product containing a ceria-zirconia-based regular array phase precursor and an aluminate-based composite oxide precursor is obtained from the solid product. The precursors in the fired product are mutually dispersed at the nano-level.

The ceria-zirconia-based regular array phase precursor is an oxide having a structure where cerium, zirconium and oxygen are irregularly arrayed. The aluminate-based composite oxide precursor is an oxide having an incomplete structure before becoming a complete aluminate-based composite oxide.

The firing temperature is not particularly limited as long as it is a temperature capable of forming precursors. The firing temperature is preferably from 400 to 850° C. When the firing temperature is 400° C. or more, precursors can be formed. The firing temperature is more preferably 600° C. or more, still more preferably 700° C. or more. On the other hand, when the firing temperature is 850° C. or less, the produced precursor can hardly undergo grain growth. The firing temperature is more preferably 825° C. or less, still more preferably 800° C. or less.

The firing atmosphere is not particularly limited as long as it is an atmosphere capable of forming precursors, and includes, for example, air.

The firing time may be appropriately determined according to the amount of the solid product. The firing time may be 1 hour or more, 2 hours or more, or 2.5 hours or more, and may be 10 hours or less, 6 hours or less, or 3.5 hours or less.

Embodiment B

In embodiment B, the solid product resulting from decomposition of the salts is preliminary fired at a temperature allowing an inorganic material in the solid product to remain, and a preliminary fired product is thereby obtained. Thereafter, the preliminary fired product is re-fired in an inert gas atmosphere to obtain a fired product containing a ceria-zirconia-based regular array phase precursor, an aluminate-based composite oxide precursor, and an organic material-derived carbide. These precursors and carbide are mutually dispersed at the nano-level.

The solid product contains, in addition to the compounds produced by decomposition of the salts, a hydroxycarboxylic acid used for gelling the aqueous solution containing the salts. By the preliminary firing, the hydroxycarboxylic acid is dehydrated, and the dehydrated hydroxycarboxylic acid is caused to remain as an inorganic material in the preliminary fired product.

The preliminary firing temperature is not particularly limited as long as it is a temperature capable of dehydrating the hydroxycarboxylic acid. In the case where the hydroxycarboxylic acid is a citric acid, the preliminary firing temperature is preferably from 150 to 300° C. When the prefiring temperature is 150° C. or more, the citric acid can be dehydrated. The preliminary firing temperature is more preferably 175° C. or more. On the other hand, when the prefiring temperature is 300° C. or less, the dehydrated citric acid is not decomposed into carbon dioxide, etc. The preliminary firing temperature is more preferably 250° C. or less, still more preferably 200° C. or less. The same may apply to the tartaric acid and the lactic acid.

The preliminary firing atmosphere is not particularly limited as long as the hydroxycarboxylic acid can be dehydrated, and includes, for example, air.

The preliminary firing time may be appropriately determined according to the amount of the solid product. The preliminary firing time may be 10 minutes or more, 20 minutes or more, or 25 minutes or more, and may be 60 minutes or less, 45 minutes or less, or 35 minutes or less.

The preliminary fired product obtained in this way is re-fired in an inert gas atmosphere. By re-firing the preliminary fired product, a ceria-zirconia-based regular array phase precursor and an aluminate-based composite oxide precursor are obtained. In addition, an organic material remaining in the preliminary fired product is carbonized to obtain an organic material-derived carbide. That is, by the re-firing, a fired product containing a ceria-zirconia-based regular array phase precursor, an aluminate-based composite oxide precursor, and an organic material-derived carbide is obtained.

The re-firing temperature is not particularly limited as long as it is a temperature capable of forming precursors and carbonizing the organic material. The re-firing temperature is preferably from 550 to 850° C. When the re-firing temperature is 550° C. or more, the organic material can be carbonized. The re-firing temperature is more preferably 575° C. or more. On the other hand, when the re-firing temperature is 850° C. or less, the produced precursor can hardly undergo grain growth. The re-firing temperature is more preferably 800° C. or less, still more preferably 700° C. or less.

The re-firing is performed in an inert gas atmosphere, whereby the organic material-derived carbide is prevented from burning to carbon dioxide, etc. The inert gas in the re-firing includes a nitrogen gas, etc., in addition to a Group 18 element gas such as argon gas.

The re-firing time may be appropriately determined according to the amount of the preliminary fired product. The firing time may be 0.5 hours or more, 1 hour or more, or 1.5 hours or more, and may be 8 hours or less, 4 hours or less, or 2.5 hours or less.

(Reducing Heat Treatment of Fired Product)

With respect to reducing heat treatment of the fired product, embodiment 1 and embodiment 2 are described here, but the reducing heat treatment is not limited thereto.

Embodiment 1

In one embodiment of the present invention, the fired product containing a ceria-zirconia-based regular array phase precursor and an aluminate-based composite oxide precursor is subjected to a reducing heat treatment to obtain a first composite having mutually dispersed therein a pyrochlore phase and an aluminate-based composite oxide.

In general, when a solid solution of ceria and zirconia is subjected to a reducing heat treatment, a pyrochlore phase can be obtained. However, the pyrochlore phase undergoes grain growth during the reducing heat treatment. The same applies to the case where part of cerium is replaced by lanthanum and part of zirconium is replaced by yttrium.

On the other hand, in the production method of the present invention, the fired product containing a ceria-zirconia-based regular array phase precursor and an aluminate-based composite oxide precursor is subjected to a reducing heat treatment. Then, a pyrochlore phase is produced while reducing the ceria-zirconia-based regular array phase precursor, and an aluminate-based composite oxide is produced simultaneously. At this time, the aluminate-based composite oxide acts as a diffusion barrier material and inhibits the pyrochlore phase from undergoing grain growth. In addition, since the ceria-zirconia-based regular array phase precursor and the aluminate-based composite oxide precursor are mutually dispersed at the nano-level, a ceria-zirconia-based regular array phase and an aluminate-based composite oxide are also mutually dispersed at the nano-level to form a first composite.

In the case of performing a reducing heat treatment of the fired product further containing an organic-derived carbide in addition to a ceria-zirconia-based regular array phase precursor and an aluminate-based composite oxide precursor, the aluminate-based composite oxide and the organic material-derived carbide act as a diffusion barrier material and inhibit the pyrochlore phase from undergoing grain growth. In addition, since the ceria-zirconia-based regular array phase precursor, the aluminate-based composite oxide precursor and the organic material-derived carbide are mutually dispersed at the nano-level, a pyrochlore phase, an aluminate-based composite oxide and the organic material-derived carbide are also mutually dispersed at the nano-level to form a first composite. Furthermore, the organic material-derived carbide also inhibits the pyrochlore phase and the aluminate-based composite oxide from aggregating without any space, and therefore the specific surface area of the first composite is enhanced.

As described above, the ceria-zirconia-based regular array phase precursor has a structure where cerium, zirconium and oxygen are irregularly arrayed, and the aluminate-based composite oxide precursor has a structure of incomplete aluminate-based composite oxide. The reducing heat treatment temperature is not particularly limited as long as it is a temperature suitable for transforming the irregular array or incomplete structure into a regular array or a complete structure by allowing a reducing atmosphere to moderately act on oxygen in the precursors.

As a guide, the reducing heat treatment temperature is preferably from 900 to 1,350° C. When the reducing heat treatment temperature is 900° C. or more, the reducing atmosphere is likely to act on oxygen also in the inside of the precursor. The reducing heat treatment temperature is more preferably 950° C. or more, still more preferably 1,000° C. or more. On the other hand, when the reducing heat treatment temperature is 1,350° C. or less, the reducing atmosphere can be hardly allowed to excessively act on oxygen in the precursor and prevent the aluminate-based composite oxide and/or the organic material-derived carbide from acting as a diffusion barrier material. The reducing heat treatment temperature is more preferably 1,325° C. or less, still more preferably 1,200° C. or less.

The reducing heat treatment time may be appropriately determined according to the amount of the precursor. The reducing heat treatment temperature may be 0.5 hours or more, 1.5 hours or more, or 2.5 hours or more, and may be 8 hours or less, 6 hours or less, or 3.5 hours or less.

The atmosphere of the reducing heat treatment is not particularly limited as long as it is a reducing atmosphere, and includes, for example, CO, HC, $H_2$, and other hydrocarbon gases. The atmosphere may also be a mixture of such a gas with an argon gas, etc.

Embodiment 2

In embodiment 2, the reducing heat treatment may comprise the followings: adding a hydroxycarboxylic acid and water to the fired product containing a ceria-zirconia-based regular array phase precursor and an aluminate-based composite oxide precursor to obtain a mixed solution, drying the mixed solution to obtain a dried body, calcining the dried body at a temperature allowing an inorganic material in the dried body to remain, thereby obtaining a calcined product, re-firing the calcined product in an inert gas atmosphere to obtain a re-fired product containing the ceria-zirconia-based regular array phase precursor, the aluminate-based composite oxide precursor, and the organic material-derived carbide, and subjecting the re-fired product to the above-described reducing heat treatment.

The hydroxycarboxylic acid added to the fired product may be the same as the hydroxycarboxylic acid used for the production of a gel.

The hydroxycarboxylic acid added to the fired product remains as an inorganic material in the calcined product and turns into an organic material-derived carbide after re-firing. The amount of the hydroxycarboxylic acid may be appropriately determined according to the amount of the organic material-derived carbide to be produced.

Assuming that the mass of the fired product is 1, the mass of the hydroxycarboxylic acid is preferably from 4 to 12 (mass ratio). When the mass ratio of the hydroxycarboxylic acid is 4 or more, the action of the organic material-derived carbide is notably exhibited. The mass ratio is more preferably 6 or more. On the other hand, when the mass ratio of the hydroxycarboxylic acid is 12 or less, the organic material-derived carbide is prevented from remaining in a large amount after the oxidizing heat treatment to adversely affect the performance of the oxygen storage material. The mass ratio is more preferably 10 or less.

Drying of the mixed solution may be sufficient if the water in the dried body is evaporated to the extent not adversely affecting the calcination of the dried body.

The calcination of the dried body may be the same as the preliminary firing of the solid product. However, compared with the solid product, in the case of the dried body, the hydroxycarboxylic acid has not penetrated inside the dried body. Accordingly, it may also be possible to cause penetration of the hydroxycarboxylic acid into the dried body at a low temperature in the first half of calcination and dehydrate the entire hydroxycarboxylic acid penetrated into the dried body at a high temperature in the latter half of calcination. For example, the dried body is heated at 150 to 200° C. over 15 to 45 minutes in the first half of calcination, and the dried body is heated at 250° to 350° C. over 5 to 15 minutes in the latter half of calcination.

Re-firing of the calcined product may be the same as re-firing of the preliminary fired product.

The re-fired product obtained by re-firing contains a ceria-zirconia-based regular array phase precursor, an aluminate-based composite oxide precursor, and an organic material-derived carbide. When the thus-obtained re-fired product is subject to the above-described reducing heat treatment, the aluminate-based composite oxide and the organic material-derived carbide can act as a diffusion barrier material, and a ceria-zirconia-based regular array phase and an aluminate-based composite oxide are mutually dispersed at the nano-level.

(Oxidizing Heat Treatment of First Composite)

The first composite is subjected to an oxidizing heat treatment to obtain a second dispersion phase in which at least part of the pyrochlore phase is transformed into a κ phase.

The ceria-zirconia-based regular array phase includes a pyrochlore phase in a reduced state and a κ phase in an oxidized state.

The first composite is obtained by a reducing heat treatment of the ceria-zirconia-based regular array phase precursor, and therefore the ceria-zirconia-based composite oxide in the first composite has a pyrochlore phase in a reduced state. Then, the first composite is subjected to an oxidizing heat treatment to transform the pyrochlore phase into a κ phase, thereby obtaining a second composite. Ideally, all pyrochlore phases in the first composite should be transformed into a κ phase, but it may be sufficient if at least part of the pyrochlore phase is transformed into a κ phase.

In addition, when an oxidizing heat treatment of the first composite is performed, the organic material-derived carbide remaining in the first composite turns into carbon dioxide, etc., whereby the carbide can be removed from the first composite.

The oxidizing heat treatment temperature is not particularly limited as long as the pyrochlore phase can be transformed into a κ phase and the organic material-derived carbide remaining in the first composite can be burned to carbon dioxide, etc. The oxidizing heat treatment temperature is preferably from 400 to 700° C. When the oxidizing heat treatment temperature is 400° C. or more, many of the pyrochlore phase can be transformed into a κ phase, and many of the carbide in the first composite can be burned. The oxidizing heat treatment temperature is more preferably 450° C. or more, still more preferably 500° C. or more. On the other hand, when the oxidizing heat treatment temperature is 700° C. or less, the pyrochlore phase, κ phase and aluminate-based composite oxide in the second composite are prevented from undergoing grain growth. The oxidizing heat treatment temperature is more preferably 650° C. or less, still more preferably 600° C. or less.

The oxidizing heat treatment time may be appropriately determined according to the amount of the first composite. The oxidizing heat treatment time may be 0.5 hours or more, 1 hour or more, or 1.5 hours or more, and may be 8 hours or less, 4 hours or less, or 2.5 hours or less.

The atmosphere of the oxidizing heat treatment is not particularly limited as long as at least part of the pyrochlore phase in the first composite can be oxidized and transformed into a κ phase, and includes, for example, air.

In the second composite obtained by an oxidizing heat treatment of the first composite, a ceria-zirconia-based regular array phase and an aluminate-based composite oxide are mutually dispersed at the nano-level.

FIG. 1 is a schematic view illustrating the microstructure of an oxygen storage material obtained by the production method of the present invention. The ceria-zirconia-based regular array phase is a κ phase in an oxidized state and a pyrochlore phase in a reduced state. As illustrated in FIG. 1, in an air atmosphere, the ceria-zirconia-based regular array phase (1) has a κ phase (1a) and a pyrochlore phase (1b). The ceria-zirconia-based regular array phase (1) and the aluminate-based composite oxide precursor (2) are mutually dispersed at the nano-level.

Each of the ceria-zirconia-based regular array phase (1) and the aluminate-based composite oxide (2) may be particles. The κ phase (1a) and/or the pyrochlore phase (1b) may be particles. In other words, the ceria-zirconia-based regular array phase (1) may be ceria-zirconia-based regular array phase particles, the κ phase (1a) may be κ phase particles, the pyrochlore phase (1b) may be pyrochlore phase particles, and the aluminate-based composite oxide (2) may be aluminate-based composite oxide particles.

An irregular phase (random phase) failing in transforming into a ceria-zirconia-based regular array phase (1) from the precursor is allowed to remain (not illustrated). The irregular phase may be an irregular phase particle.

(Re-Oxidizing Heat Treatment)

After the oxidizing heat treatment, a re-oxidizing heat treatment may be further performed, if necessary. By re-oxidizing heat treatment, the $H_2$ consumption of the oxygen storage material is improved.

The re-oxidizing heat treatment temperature is not particularly limited as long as it is a temperature capable of improving the $H_2$ consumption of the oxygen storage material, but typically, the re-oxidizing heat treatment temperature is a temperature higher than the oxidizing heat treatment temperature.

The re-oxidizing heat treatment temperature is preferably from 850 to 1,150° C. When the re-oxidizing heat treatment temperature is 850° C. or more, the $H_2$ consumption of the oxygen storage material can be improved. The re-oxidizing heat treatment temperature is more preferably 900° C. or more, still more preferably 950° C. or more. On the other hand, when the re-oxidizing heat treatment temperature is 1,150° C. or less, particles are not sintered to each other. The re-oxidizing heat treatment temperature is more preferably 1,100° C. or less, still more preferably 1,050° C. or less. Here, the wording of the particles means the ceria-zirconia-based regular array phase (1) and the aluminate-based composite oxide (2).

The re-oxidizing heat treatment time may be appropriately determined according to the amount of the second composite after the oxidizing heat treatment. The re-oxidizing heat treatment time may be 3 hours or more, 4 hours or more, or 4.5 hours or more, and may be 7 hours or less, 6 hours or less, or 5.5 hours or less.

(Supporting of Catalyst Metal Fine Particles)

The oxygen storage material (second composite) obtained by the production method described hereinbefore can be formed into an exhaust gas purification catalyst by supporting thereon metal fine particles usable as a catalyst.

As the metal fine particles, for example, a metal such as ruthenium (Ru), rhodium (Rh), palladium (Pd), osmium (Os), iridium (Ir), platinum (Pt), gold (Au), copper (Cu), iron (Fe) and nickel (Ni), an oxide thereof, or an any combination thereof, each having a particle diameter of 2 to 6 nm, may be supported, for example, in an amount of approximately from 0.01 to 5.0 mass %.

The method for supporting the metal fine particles are not particularly limited and includes, for example, an impregnation supporting method and a surface precipitation method, and a general method may be employed.

(Oxygen Storage Material)

The oxygen storage material produced by the production method described hereinbefore is described blow.

(Mutual Dispersion)

In the oxygen storage material produced by the production method of the present invention, a ceria-zirconia-based regular array phase and an aluminate-based composite oxide are mutually dispersed at the nano-level.

The ceria-zirconia-based regular array phase includes a pyrochlore phase ($Ce_2Zr_2O_7$) in a reduced state and a κ phase ($Ce_2Zr_2O_8$) in an oxidized state. In the case where all of the ceria-zirconia-based regular phases are in a reduced state, the phase is represented by $Ce_2Zr_2O_7$, and in the case where all of the ceria-zirconia-based regular phases are in an oxidized state, the phase is represented by $Ce_2Zr_2O_8$. In the case where a reduced state and an oxidized state are mixed, x of $Ce_2Zr_2O_x$ is more than 7 and less than 8. Part of Ce may be replaced by La.

In the oxygen storage material produced by the production method of the present invention, at least part of the ceria-zirconia-based regular array phase is a κ phase, and the whole of this ceria-zirconia-based regular array phase is represented by $Ce_2Zr_2O_x$ (wherein x is more than 7 and 8 or less).

The aluminate-based composite oxide is not particularly limited as long as it works out to a diffusion barrier material against grain growth of the ceria-zirconia-based regular array phase, and includes, for example, $MgAl_2O_4$, $LaAlO_3$, and $CaAl_4O_7$.

(Particle Diameter of Ceria-Zirconia-Based Regular Array Phase)

The grain growth of the ceria-zirconia-based regular array phase can be inhibited by mutual dispersion at the nano-level of the ceria-zirconia-based regular array phase and the aluminate-based composite oxide, and therefore the particle diameter of the ceria-zirconia-based regular array phase is from 18 to 33 nm in terms of the (222) average particle diameter.

The (222) average particle diameter is defined as follows. An X-ray diffraction pattern of the oxygen storage material is obtained, the (111) diffraction line and the (222) diffraction line of the ceria-zirconia-based regular array phase are precisely analyzed, the crystallite diameter in a direction perpendicular to (222) of the ceria-zirconia-based regular array phase is determined from the half value of the (222) diffraction line, and the obtained value is defined as the (222) average particle diameter.

When the (222) average particle diameter is 33 nm or less, the effect of mutual dispersion at the nano-level of a ceria-zirconia-based regular array phase and an aluminate composite oxide is notably recognized. When the (222) average particle diameter is 25 nm or less, the effect above is more notably recognized.

On the other hand, the (222) average particle diameter may be 18 nm or more. The (222) average particle diameter is related to the molar ratio represented by (molar number of aluminate-based composite oxide)/(molar number of ceria-zirconia-based regular array phase). When the (222) average particle diameter is 18 nm or more, while enjoying the notable grain growth-inhibiting action, the relative amount of the ceria-zirconia-based composite oxide in the oxygen storage material is not decreased excessively.

EXAMPLES

The present invention is described more specifically by referring to Examples and Comparative Examples. However, the present invention is not limited to these Examples.

Example 1

Example 1 is an example including <Embodiment A> and <Embodiment 1> above. Details are described below.

$Mg(NO_3)_2.6H_2O$: 10 mmol, $Al(NO_3)_3.9H_2O$: 20 mmol, $Ce(NO_3)_3.6H_2O$: 3.5 mmol, $La(NO_3)_3.6H_2O$: 6.5 mmol, and $ZrO(NO_3)_2.H_2O$: 10 mmol were added to 50 mL of pure water and dissolved by stirring to form a metal ion solution. Citric acid monohydrate: 50 mmol was added to 10 mL of pure water and dissolved by stirring to form a citric acid solution. The metal ion solution was added to the citric acid solution and stirred to form a mixed solution. The mixed solution was heated at 80° C. with stirring to evaporate the water. When much water was evaporated and the viscosity was increased due to hydrogen bonding of citric acid, the solution was charged into a vacuum dryer and dried at 60° C. for about 10 hours to obtain a gel.

The gel was heated by a heater at 180° C. over 10 to 30 minutes to decompose the nitrates, and the solid product after decomposition was charged into a crucible and heated using an electric furnace at 200° C. over 30 minutes to dry the solid product.

The dried solid product was fired in the air at 750° C. during 3 hours to obtain a fired product containing a ceria-zirconia-based regular array phase precursor and an aluminate-based composite oxide precursor.

The fired product was subjected to a reducing heat treatment at 1,100° C. during 3 hours under a 5% $H_2$—Ar gas flow to obtain a first composite.

The first composite was subjected to an oxidizing heat treatment in the air at 550° C. during 2 hours to obtain a second composite. By this oxidizing heat treatment, at least part of the pyrochlore phase in the first composite was transformed into a κ phase. In this way, the oxygen storage material of Example 1 was obtained. At the time of preparation of the oxygen storage material of Example 1, the charging amounts of $Mg(NO_3)_2.6H_2O$, $Al(NO_3)_3.9H_2O$, $Ce(NO_3)_3.6H_2O$, $La(NO_3)_3.6H_2O$, and $ZrO(NO_3)_2.H_2O$ charged were set such that the molar ratio represented by (molar number of aluminate-based composite oxide)/(molar of ceria-zirconia-based regular array phase) becomes 2.

Examples 2 to 5

The oxygen storage materials of Examples 2, 3, 4 and 5 were prepared in the same manner as in Example 1 except that the amounts of $Mg(NO_3)_2.6H_2O$, $Al(NO_3)_3.9H_2O$, $Ce(NO_3)_3.6H_2O$, $La(NO_3)_3.6H_2O$, and $ZrO(NO_3)_2.H_2O$ charged were set such that the molar ratio becomes 0.5, 0.75, 1.0, and 3.0.

Example 6

The oxygen storage material of Example 6 was obtained in the same manner as in Example 1 except that $Al(NO_3)_3.9H_2O$: 10 mmol, $Ce(NO_3)_3.6H_2O$: 6 mmol, $La(NO_3)_3.6H_2O$: 14 mmol, and $ZrO(NO_3)_2.H_2O$: 10 mmol were added to 50 mL of pure water and dissolved by stirring to form a metal ion solution and citric acid monohydrate: 40 mmol was added to 10 mL of pure water and dissolved by stirring to form a citric acid solution.

Example 7

The oxygen storage material of Example 7 was obtained in the same manner as in Example 1 except that $Ca(NO_3)_2.4H_2O$: 5 mmol, $Al(NO_3)_3.9H_2O$: 20 mmol, $Ce(NO_3)_3.6H_2O$: 5 mmol, and $ZrO(NO_3)_2.H_2O$: 5 mmol were added to 50 mL of pure water and dissolved by stirring to form a metal ion solution and citric acid monohydrate: 35 mmol was added to 10 mL of pure water and dissolved by stirring to form a citric acid solution.

Example 8

The oxygen storage material of Example 8 was obtained in the same manner as in Example 1 except that $Mg(NO_3)_2.4H_2O$: 5 mmol, $Al(NO_3)_3.9H_2O$: 10 mmol, $Ce(NO_3)_3.6H_2O$: 5 mmol, and $ZrO(NO_3)_2.H_2O$: 5 mmol were added to 50 mL of pure water and dissolved by stirring to form a metal ion solution and citric acid monohydrate: 35 mmol was added to 10 mL of pure water and dissolved by stirring to form a citric acid solution.

Example 9

Example 9 is an example including <Embodiment B> and <Embodiment 1> above. Details are described below.

$Mg(NO_3)_2.6H_2O$: 10 mmol, $Al(NO_3)_3.9H_2O$: 20 mmol, $Ce(NO_3)_3.6H_2O$: 3.5 mmol, $La(NO_3)_3.6H_2O$: 6.5 mmol, and $ZrO(NO_3)_2.H_2O$: 10 mmol were added to 50 mL of pure water and dissolved by stirring to form a metal ion solution. Citric acid monohydrate: 50 mmol was added to 10 mL of pure water and dissolved by stirring to form a citric acid solution. The metal ion solution was added to the citric acid solution and stirred to form a mixed solution. The mixed solution was heated at 80° C. with stirring to evaporate the water. When much water was evaporated and the viscosity was increased due to hydrogen bonding of citric acid, the solution was charged into a vacuum dryer and dried at 60° C. for about 10 hours to obtain a gel.

The gel was heated by a heater at 180° C. during 10 to 30 minutes to decompose the nitrates, and the solid product after decomposition was charged into a crucible and heated using an electric furnace at 200° C. during 30 minutes, thereby performing preliminary firing, to obtain a preliminary fired product in which dehydrated citric acid was allowed to remain.

The preliminary fired product was re-fired in an Ar gas atmosphere at 600° C. during 3 hours to obtain a fired product containing a ceria-zirconia-based regular phase precursor, an aluminate-based composite oxide precursor, and a carbide derived from the dehydrated citric acid.

This fired product was subjected to a reducing heat treatment at 1,100° C. during 3 hours under an Ar gas flow to obtain a first composite.

The first composite was subjected to an oxidizing heat treatment in the air at 600° C. during 2 hours to obtain a second composite, and this was the oxygen storage material of Example 9. By the oxidizing heat treatment above, the dehydrated citric acid-derived carbide in the first composite was burned, and a carbide was not present in the second composite. In addition, by the oxidizing heat treatment, at least part of the pyrochlore phase in the first composite was transformed into a κ phase.

Example 10

The oxygen storage material of Example 10 was obtained by further subjecting the oxygen storage material of Example 1 to a re-oxidizing heat treatment in the air at 1,000° C. during 5 hours.

Example 11

Example 11 is an example including <Embodiment A> and <Embodiment 2> above. Details are described below.

$Mg(NO_3)_2.6H_2O$: 10 mmol, $Al(NO_3)_3.9H_2O$: 20 mmol, $Ce(NO_3)_3.6H_2O$: 3.5 mmol, $La(NO_3)_3.6H_2O$: 6.5 mmol, and $ZrO(NO_3)_2H_2O$: 10 mmol were added to 50 mL of pure water and dissolved by stirring to form a metal ion solution. Citric acid monohydrate: 50 mmol was added to 10 mL of pure water and dissolved by stirring to form a citric acid solution. The metal ion solution was added to the citric acid solution and stirred to form a mixed solution. The mixed solution was heated at 80° C. with stirring to evaporate the water. When much water was evaporated and the viscosity was increased due to hydrogen bonding of citric acid, the solution was charged into a vacuum dryer and dried at 60° C. for about 10 hours to obtain a gel.

The gel was heated by a heater at 200° C. over 30 minutes to decompose the nitrates and dry the solid product after the decomposition of nitrates.

The dried solid product was fired in the air at 400° C. during 1 hour to obtain a fired product containing a ceria-zirconia-based regular array phase precursor and an aluminate-based composite oxide precursor.

The aqueous citric acid solution was added to the fired product to obtain a mixed solution. The ratio of the mass of the fired product and the mass of the citric acid was at 1:6. Thereafter, water in the mixed solution was evaporated to obtain a dried body.

The dried body was calcined The calcination was performed in 2 parts at 200° C. for 30 minutes and at 300° C. for 10 minutes. By the calcination, the citric acid in the dried body was dehydrated, and the dehydrated citric acid was caused to remain as an organic material in the calcined product.

The calcined product was re-fired in an Ar gas atmosphere at 600° C. during 3 hours to obtain a re-fired product containing a ceria-zirconia-based regular phase precursor, an aluminate-based composite oxide precursor, and a carbide derived from the dehydrated citric acid.

This re-fired product was subjected to a reducing heat treatment at 1,100° C. during 3 hours under an Ar gas flow to obtain a first composite.

The first composite was subjected to an oxidizing heat treatment in the air at 550° C. during 2 hours to obtain a second composite, and this was the oxygen storage material of Example 11. By the oxidizing heat treatment above, at least part of the pyrochlore phase in the first composite was transformed into a κ phase.

Example 12

The oxygen storage material of Example 12 was obtained in the same manner as in Example 11 except that the metal ion solution was $2MgAlO_4+CeLaY_{0.2}Zr_2$ in terms of the charge composition. Incidentally, when nitrates are blended as in Example 11, the charge composition of the metal ion solution is $2MgAlO_4+La_{1.3}Y_{0.2}Zr_2$.

Example 13

The oxygen storage material of Example 13 was obtained in the same manner as in Example 11 except that the fired product containing a ceria-zirconia-based regular phase precursor and an aluminate-based composite oxide precursor was obtained by firing the dried solid product in the air at 600° C. during 3 hours.

Example 14

The oxygen storage material of Example 14 was obtained in the same manner as in Example 12 except that the ratio between the mass of the fired product and the mass of the citric acid was changed to 1:10 and the fired product containing a ceria-zirconia-based regular phase precursor and an aluminate-based composite oxide precursor was obtained by firing the dried solid product in the air at 600° C. during 3 hours.

Example 15

The oxygen storage material of Example 15 was obtained in the same manner as in Example 1 except that the reducing heat treatment temperature of Example 1 was changed to 1,300° C.

Example 16

On 8.63 g (10 mmol) of the oxygen storage material of Example 9, 1 mg of platinum (Pt) was supported. The oxygen storage material having supported thereon platinum and 8.63 g (10 mmol) of the oxygen storage material of Example 10 were physically mixed to form an exhaust gas purification catalyst.

The method of supporting platinum on the oxygen storage material of Example 9 is as follows. A predetermined amount of the oxygen storage material powder was dispersed in 100 mL of pure water, followed by stirring, and to this solution, a dinitrodiamine platinum solution corresponding to 1 mg of platinum was added. The mixed solution was stirred and heated on a hot stirrer, and the stirred and heated solution was then evaporated to dryness, further dried at 120° C. during 2 hours, and fired at 500° C. during 2 hours to form a platinum catalyst.

With respect to the physically mixing method, the platinum catalyst and the powder of the oxygen storage material of Example 10 were mixed using a powder mixer, and further mixed in a mortar to form an exhaust gas purification catalyst.

Comparative Example 1

$Ce(NO_3)_3.6H_2O$: 7.9 mmol, $La(NO_3)_3.6H_2O$: 14.6 mmol, and $ZrO(NO_3)_2.H_2O$: 22.5 mmol were added to 30 mL of pure water and dissolved by stirring to form a metal ion solution. Citric acid monohydrate: 45 mmol was added to 10 mL of pure water and dissolved by stirring to form a citric acid solution. The metal ion solution was added to the citric acid solution and stirred to form a mixed solution. The mixed solution was heated at 80° C. with stirring to evaporate the water. When much water was evaporated and the viscosity was increased due to hydrogen bonding of citric acid, the solution was charged into a vacuum dryer and dried at 60° C. for about 10 hours to obtain a gel.

The gel was heated by a heater at 180° C. during 10 to 30 minutes to decompose the nitrates, and the solid product after decomposition was charged into a crucible and heated using an electric furnace at 200° C. during 30 minutes to dry the solid product.

The dried solid product was fired in the air at 750° C. during 3 hours to obtain a fired product containing a ceria-zirconia-based regular array phase precursor.

The fired product was subjected to a reducing heat treatment at 1,100° C. during 3 hours under a 5% $H_2$—Ar gas flow to obtain a pyrochlore phase.

The pyrochlore phase was subjected to an oxidizing heat treatment in the air at 550° C. during 2 hours to obtain an oxygen storage material ($Ce_{0.7}La_{1.3}Zr_2O_x$) in which at least part of the pyrochlore phase was transformed into a κ phase.

Comparative Example 2

An oxygen storage material ($Ce_{0.5}La_{1.5}Zr_2O_{7.25}$) was obtained in the same manner as in Comparative Example 1 except that $Ce(NO_3)_3.6H_2O$: 2.5 mmol, $La(NO_3)_3.6H_2O$: 7.5 mmol, and $ZrO(NO_3)_2.H_2O$: 10 mmol were added to 30 mL of pure water and dissolved by stirring to form a metal ion solution and citric acid monohydrate: 20 mmol was added to 10 mL of pure water and dissolved by stirring to form a citric acid solution.

Comparative Example 3

An oxygen storage material ($Ce_2Zr_2O_8$) was obtained in the same manner as in Comparative Example 1 except that $Ce(NO_3)_3 \cdot 6H_2O$: 10 mmol and $ZrO(NO_3)_2 \cdot H_2O$: 10 mmol were added to 20 mL of pure water and dissolved by stirring to form a metal ion solution and citric acid monohydrate: 20 mmol was added to 10 mL of pure water and dissolved by stirring to form a citric acid solution.

Comparative Example 4

The oxygen storage material of Comparative Example 4 was obtained by further subjecting the oxygen storage material of Comparative Example 1 to a re-oxidizing heat treatment in the air at 1,000° C. during 5 hours.

Comparative Example 5

A solid solution of ceria and zirconia, having a composition of $Ce_{1.84}Zr_{2.16}O_x$, was subjected to a reducing heat treatment at 1,700° C. by using carbon as a reducing agent to obtain an oxygen storage material having a ceria-zirconia-based regular array phase in which the crystallite is at the micron level.

Comparative Example 6

A solid solution of ceria and zirconia, having a composition of $Ce_{0.7}La_{1.3}Zr_2O_x$, was subjected to a reducing heat treatment at 1,300° C. during 3 hours under a 5% $H_2$—Ar gas flow to obtain an oxygen storage material having a ceria-zirconia-based regular array phase.

Comparative Example 7

On 4.08 g (40 mmol) of alumina ($Al_2O_3$) having a surface area of about 100 $m^2/g$, 1 mg of platinum was supported. This oxygen storage material having supported thereon platinum and 57 g (20 mmol) of the oxygen storage material of Comparative Example 1 were physically mixed to form an exhaust gas purification catalyst. The method of supporting platinum and the physically mixing method are the same as in Example 16.

(Evaluation)

The thus-obtained oxygen storage materials of Examples 1 to 16 and Comparative Examples 1 to 7 were evaluated as follows.

(X-Ray Diffraction Analysis)

With respect to the oxygen storage materials of Example 1, Examples 6 to 9 and Comparative Examples 2 and 3, X-ray diffraction analysis was performed. FIGS. 2A to 2E illustrate the diffraction patterns of Example 1 and Examples 6 to 9. In addition, the composition of each oxygen storage material was identified by comparison of the diffraction pattern of FIG. 2 with JCPD card. The results are shown in Table 1.

TABLE 1

| | Oxygen Storage Material (Product) | | |
|---|---|---|---|
| | Charge Composition (only metallic elements) | Ceria-Zirconia-Based Regular Array Phase | Aluminate-Based Composite Oxide |
| Example 1 | 2MgAl2 + Ce0.7La1.3Zr2 | Ce0.7La1.3Zr2O7.35 | MgAl2O4 |
| Example 6 | 2LaAl + Ce1.2La0.8Zr2 | Ce0.57La1.43Zr2O7.3 | LaAlO3 |
| Example 7 | 2CaAl4 + CeZr2 | Ce2Zr2O8 | CaAl4O7 |
| Example 8 | 2MgAl4 + CeZr2 | Ce2Zr2O8 | MgAl2O4 |
| Example 9 | 2MgAl2 + Ce0.7La1.3Zr2 | Ce0.7La1.3Zr2O7.35 | MgAl2O4 |

Figure 3:
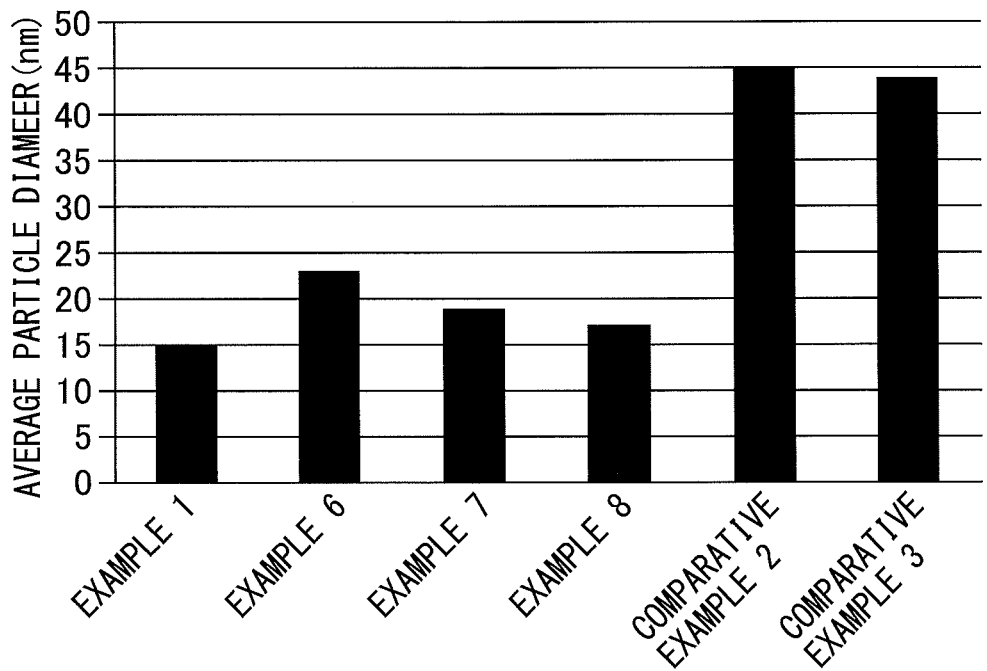
[FIG. 3] A graph illustrating the results from measuring the (222) average particle diameter of the ceria-zirconia-based regular array phase of oxygen storage materials of Example 1, Examples 6 to 8, and Comparative Examples 2 and 3.

Next, the (111) diffraction line and the (222) diffraction line of the ceria-zirconia-based regular array phase of each of FIGS. 2A to 2D were precisely analyzed and then the each of the (222) average particle diameter of oxygen storage materials respectively were determined from the half value of the (222) diffraction line. FIG. 3 illustrates the results.

As shown in Table 1 and FIG. 3, compared with the (222) average particle diameters of Comparative Examples 2 and 3, the (222) average particle diameter of each of Example 1 and Examples 6 to 8 is small. In the oxygen storage materials of Comparative Examples 2 and 3, the ceria-zirconia-based regular array phase is present alone, and therefore it could be confirmed that in the oxygen storage materials of Example 1 and Examples 6 to 8, the aluminate-based composite oxide works out to a diffusion barrier material against grain growth of the ceria-zirconia-based regular array phase.

When in Examples 1 to 5, the molar ratio represented by (molar number of aluminate-based composite oxide)/(molar number of ceria-zirconia-based regular array phase) (hereinafter, sometimes simply referred to as "molar ratio") was changed in the range of 0.5 to 3, the (222) average particle diameters of the oxygen storage materials are shown in Table 2 and FIG. 4. The (222) average particle diameter of the oxygen storage material of Comparative Example 1 (corresponding to a molar ratio of 0) is shown together in Table 2 and FIG. 4.

TABLE 2

| | Molar Ratio | (222) Average Particle Diameter (nm) |
|---|---|---|
| Comparative Example 1 | 0 | 39 |
| Example 2 | 0.5 | 33 |
| Example 3 | 0.75 | 30 |
| Example 4 | 1 | 25 |
| Example 1 | 2 | 20 |
| Example 5 | 3 | 18 |

Figure 4:
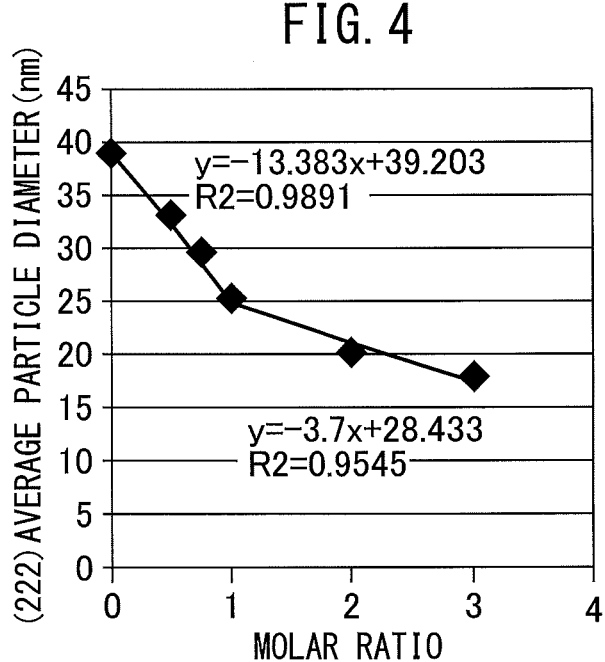
[FIG. 4] A graph illustrating the relationship between the molar ratio represented by (molar number of aluminate-based composite oxide)/(molar number of ceria-zirconia-based regular array phase) and the (222) average particle diameter of the ceria-zirconia-based regular array phase, with respect to Examples 1 to 5 and Comparative Example 1.

As shown in Table 2 and FIG. 4, it could be confirmed that when the molar ratio is 0.5 or more, the aluminate-based composite oxide notably acts as a diffusion barrier material. It could also be confirmed that when the molar ratio is 1 or more, the aluminate-based composite oxide more notably acts as a diffusion barrier material.

The (222) average particle diameters of Examples 1 and 10 and Comparative Examples 1 and 4 were also measured. The results are shown in Table 3.

TABLE 3

| | Charge Composition | (222) Average Particle Diameter (nm) |
|---|---|---|
| Example 1 | 2MgAl2O4 + Ce0.7La1.3Zr2 | 20 |
| Example 10 | | 23 |
| Comparative Example 1 | Ce0.7La1.3Zr2 | 39 |
| Comparative Example 4 | | 42 |

In Example 10, the oxygen storage material is obtained by subjecting the oxygen storage material of Example 1 to a re-oxidizing heat treatment. As shown in Table 3, the (222) average particle diameter is not greatly changed by the re-oxidizing heat treatment. However, Example 10 surpasses Example 1 in terms of the later-described $H_2$ consumption.

Figure 5:
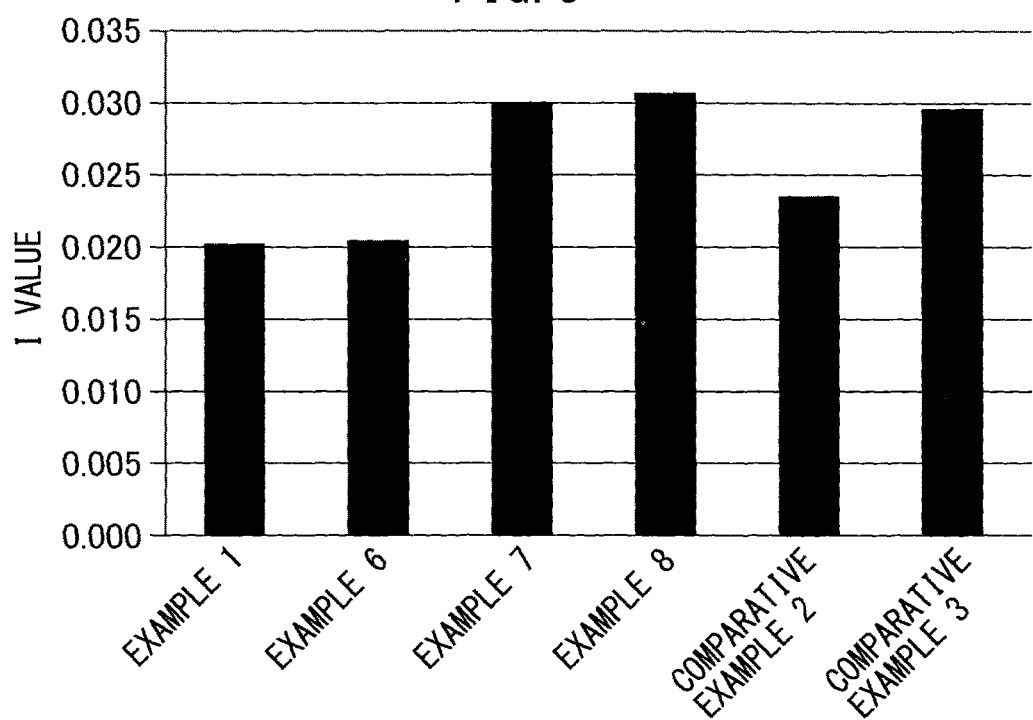
[FIG. 5] A graph illustrating I value={area of (111) peak}/{area of (222) peak}, with respect to Example 1, Examples 6 to 8, and Comparative Examples 2 and 3.

The I value of each oxygen storage material was determined. The I value is one indicator indicating the production state of the ceria-zirconia-based regular array phase. In the X-ray diffraction pattern, the diffraction line at $2\theta=14.5°$ is a diffraction line attributed to (111) plane of the κ phase. The diffraction line at $2\theta=29°$ is a line in which a diffraction line attributed to (222) plane of the κ phase and a diffraction line attributed to (111) plane of the ceria-zirconia solid solution (CZ solid solution) overlap with each other. Therefore, the I value that is an intensity ratio between two diffraction lines can be regarded as an indicator indicating the retention rate (existence rate) of the κ phase. In other words, the I value is determined according to I value={area of (111) peak}/{area of (222) peak} and works out to an indicator indicating the retention rate (existence rate) of the κ phase. FIG. 5 illustrates the calculation results of the I value.

As shown in FIG. 5, in all of Examples 7 and 8 and Comparative Example 3 where Ce is not replaced by La, the I value is of the same level. It is understood from this result that in all of Examples 7 and 8 and Comparative Example 3, a ceria-zirconia-based regular array phase is produced, though the average particle diameter is different. Accordingly, the difference in the properties such as the later-described oxygen storage capacity should be attributable to the difference in the particle diameter of the ceria-zirconia-based regular array phase.

Here, the I value of Examples 1 and 6 and Comparative Example 2 where Ce is replaced by La is lower than the I value of Examples 7 and 8 and Comparative Example 3. This occurs because in Examples 1 and 6 and Comparative Example 2, $Ce^{4+}$ is replaced by $La^{3+}$ and even when the ceria-zirconia-based regular array phase is a κ phase, the ceria-zirconia-based regular array phase takes on the aspect of a pyrochlore phase (Haruo Kishimoto et al., Journal of Alloys and Compounds, 312 (2000), pp. 94-103). However, in Examples 1 and 6 and Comparative Example 2 where La is incorporated as a substitution, an I value of the same level was exhibited. It could be confirmed from this result that also in these oxygen storage materials, a ceria-zirconia-based regular array phase is produced. Accordingly, the difference in the properties such as the later-described oxygen storage capacity should be attributable to the difference in the particle diameter.

With respect to the oxygen storage materials of Examples 11 to 14 as well, the (222) average particle diameter was determined in the same manner. The results are shown in Table 4. In Table 4, the charge composition of the metal ion solution and the amount (mass ratio) of the citric acid added to the fired product are shown together.

TABLE 4

| | Charge Composition (only metallic elements) | Mass Ratio (fired product:citric acid) | Re-firing Temperature (° C.) | Time (hours) | (222) Average Particle Diameter (nm) |
|---|---|---|---|---|---|
| Example 11 | 2MgAl2O4 + Ce0.7La1.3Zr2 | 1:6 | 400 | 1 | 13 |
| Example 12 | 2MgAl2O4 + CeLaY0.2Zr1.8 | 1:6 | 400 | 1 | 14 |
| Example 13 | 2MgAl2O4 + Ce0.7La1.3Zr2 | 1:6 | 600 | 3 | 16 |
| Example 14 | 2MgAl2O4 + CeLaY0.2Zr1.8 | 1:10 | 600 | 3 | 15 |

As shown in Table 4, all oxygen storage materials of Examples 11 to 14 have a (222) average particle diameter of the same level as in other Examples, and it could be confirmed that even when a citric acid is added to the fired product containing a ceria-zirconia-based regular array phase precursor and an aluminate-based composite oxide precursor, a carbide derived from dehydrated citric acid, which should work out to a barrier material at the time of reducing heat treatment, is obtained.

(Transmission Electron Microscope Observation and Analysis)

The oxygen storage material of Example 8 was observed with a transmission electron microscope (TEM: Transmission Electron Microscopy) and based on the observation results, the crystal structure of the oxygen storage material was analyzed.

Figure 6:
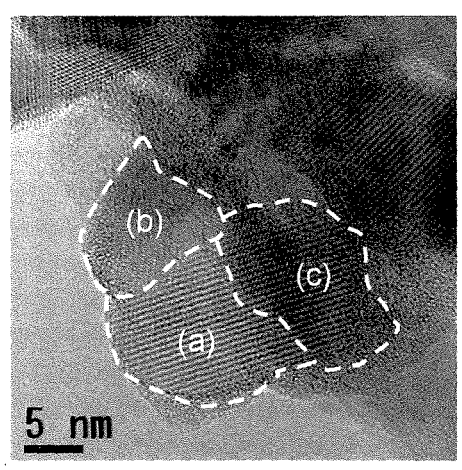
[FIG. 6] A view illustrating a first visual field out of the results (lattice images) from observing the oxygen storage material of Example 8 with a transmission electron microscope.
Figure 7A:
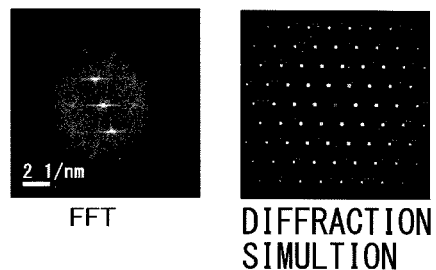
[FIG. 7A] Views illustrating an FFT (Fast Fourier Transform) pattern of the region indicated by (a) of FIG. 6 and diffraction simulation results based on the pattern.
Figure 7B:
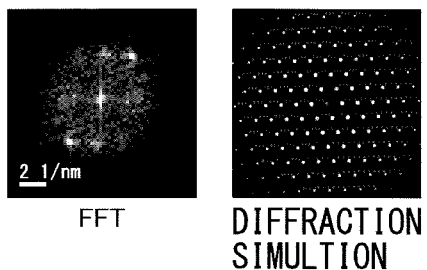
[FIG. 7B] Views illustrating an FFT (Fast Fourier Transform) pattern of the region indicated by (b) of FIG. 6 and diffraction simulation results based on the pattern.
Figure 7C:
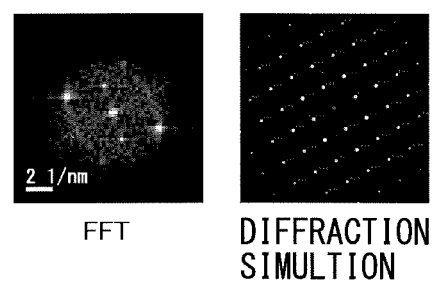
[FIG. 7C] Views illustrating an FFT (Fast Fourier Transform) pattern of the region indicated by (c) of FIG. 6 and diffraction simulation results based on the pattern.

FIG. 6 is a view illustrating a first visual field out of the results (lattice images) from observing the oxygen storage material of Example 8 with a transmission electron microscope. FIG. 7A is views illustrating an FFT (Fast Fourier Transform) pattern of the region indicated by (a) of FIG. 6 and diffraction simulation results based on the pattern. FIG. 7B is views illustrating an FFT (Fast Fourier Transform) pattern of the region indicated by (b) of FIG. 6 and diffraction simulation results based on the pattern. FIG. 7C is views illustrating an FFT (Fast Fourier Transform) pattern of the region indicated by (c) of FIG. 6 and diffraction simulation results based on the pattern.

Figure 8:
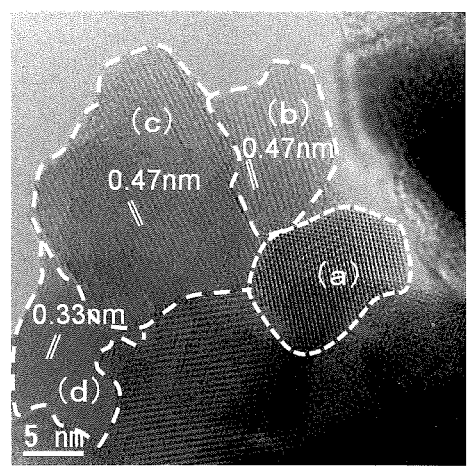
[FIG. 8] A view illustrating a second visual field out of the results (lattice images) from observing the oxygen storage material of Example 8 with an electron microscope.
Figure 9:
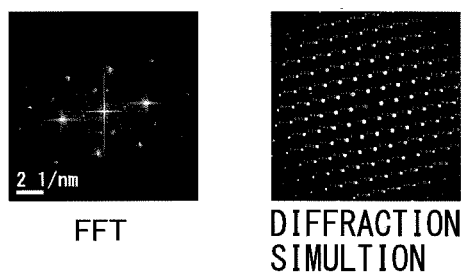
[FIG. 9] Views illustrating an FFT (Fast Fourier Transform) pattern of the region indicated by (a) of FIG. 8 and diffraction simulation results based on the pattern.

FIG. 8 is a view illustrating a second visual field out of the results (lattice images) from observing the oxygen storage material of Example 8 with an electron microscope. FIG. 9 is views illustrating an FFT (Fast Fourier Transform) pattern of the region indicated by (a) of FIG. 8 and diffraction simulation results based on the pattern.

Here, in the diffraction simulation based on the FFT pattern, an estimated electron beam diffraction pattern of a crystal is computed using a software (ReciPro), and the crystal structure is identified by comparing the computed results with the measured electron beam diffraction pattern.

FIG. 7A illustrates a crystal structure when the incidence azimuth of electron beam is [1-10], and it was known from the crystal structure that the region (a) of FIG. 6 is $Mg_2Al_2O_4$. FIG. 7B illustrates a crystal structure when the incidence azimuth of electron beam is [0-11], and it was known from the crystal structure that the region (b) of FIG. 6 is $Ce_2Zr_2O_7$. FIG. 7C illustrates a crystal structure when the incidence azimuth of electron beam is [001], and it was known from the crystal structure that the region (c) of FIG. 6 is $MgAl_2O_4$.

FIG. 9 illustrates a crystal structure when the incidence azimuth of electron beam is [1-10], and it was known from the crystal structure that the region (a) of FIG. 8 is $Mg_2Al_2O_4$.

It was also confirmed by the same analysis that the white line in the region (b) of FIG. 8 indicates (111) plane of $MgAl_2O_4$ and the distance between planes is 0.47 nm. It was confirmed that the white line in the region (c) of FIG. 8 indicates (111) planes of $MgAl_2O_4$ and the distance between the planes is 0.47 nm. It was confirmed that the white line in the region (d) of FIG. 8 indicates (111) planes of $Cz_2Zr_2O_7$ and the distance between the planes is 0.33 nm.

Here, the transmission electron microscope observation is performed by irradiating a sample with an electron beam in vacuum, and therefore even a sample transformed into a κ phase $(Ce_2Zr_2O_8)$ is sometimes transformed into a pyrochlore phase $(Ce_2Zr_2O_7)$, because a vacuum is created during observation.

As shown in FIGS. 6 to 9, with respect to the oxygen storage material of Example 8, it was confirmed that the ceria-zirconia-based regular array phase $(Ce_2Zr_2O_8$ and/or $Ce_2Zr_2O_7)$ and the aluminate-based composite oxide $(MgAl_2O_4)$ are of 8 to 12 nm and these are mutually dispersed at the nano-level.

Figure 10A:
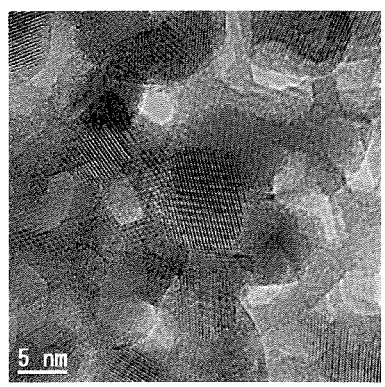
[FIG. 10A] A view illustrating a transmission image obtained by observing the oxygen storage material of Example 9 with a transmission electron microscope.
Figure 10B:
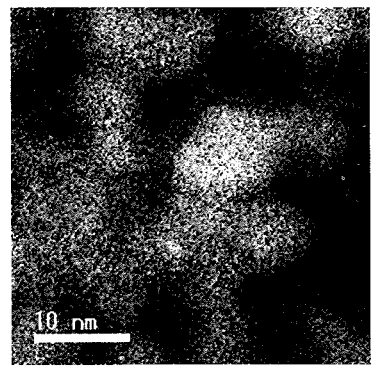
[FIG. 10B] A view illustrating the results of Ce—N EELS (EELS: Electron Energy Loss Spectroscopy) mapping of the observed region of FIG. 10A.
Figure 10C:
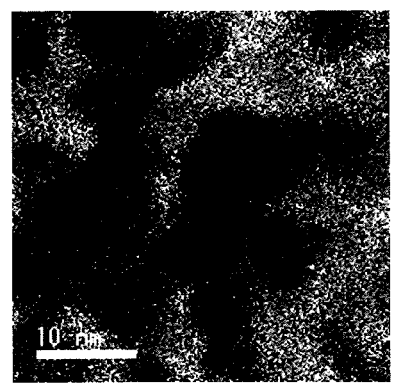
[FIG. 10C] A view illustrating the results of Al—K EELS mapping of the observed region of FIG. 10A.

With respect to the oxygen storage material of Example 9, transmission electron microscope observation and mapping by Electron Energy Loss Spectroscopy (EELS) were performed. FIGS. 10A to 10C illustrate the results. FIG. 10A is a view illustrating a transmission image obtained by observing the oxygen storage material of Example 9 with a transmission electron microscope. FIG. 10B is a view illustrating the results of Ce—N EELS mapping of the observed region of FIG. 10A. FIG. 10C is a view illustrating the results of Al—K EELS mapping of the observed region of FIG. 10A.

In FIG. 10A, a crystal grain of around 10 nm was observed. In addition, it was confirmed in FIGS. 10A and 10B that a ceria-zirconia-based regular array phase $(Ce_{0.7}La_{1.3}Zr_2O_{7.35})$ and an aluminate-based composite oxide $(MgAl_2O_4)$ are mutually dispersed at the nano-level.

(Specific Surface Area)

The specific surface area of Examples 1 and 9 and Comparative Example 1 was measured by the BET method. The results are shown in Table 5. In Table 5, the (222) average particle diameter and the average particle diameter of the aluminate-based composite oxide $(MgAl_2O_4)$ are shown together. The average particle diameter of the aluminate-based composite oxide was also determined from the X-ray diffraction pattern of each oxygen storage material.

TABLE 5

|  | (222) Average Particle Diameter (nm) | Average Particle Diameter of Aluminate-Based Composite Oxide (nm) | Specific Surface Area (m$^2$/g) |
|---|---|---|---|
| Example 1 | 19.1 | 12.8 | 2.9 |
| Example 9 | 8.5 | 9.6 | 103.0 |
| Comparative Example 1 | 39.0 | — | 4.1 |

As shown in Table 5, compared with Comparative Example 1, the specific surface area was as large as about 25 times in Example 9. This is considered to result because in Example 9, at the time of a reducing heat treatment for obtaining a first composite, the dehydrated citric acid-derived carbide intervenes between the ceria-zirconia-based regular array phase precursor $(Ce_{0.7}La_{1.3}Zr_2O_x)$ and the aluminate-based composite oxide $(MgAl_2O_4)$ precursor and the specific surface area of the oxygen storage material is increased due to the carbide. As described in <Embodiment B>, this intervening carbide is produced by the carbonization of an organic material in the preliminary fired product, which occurred due to re-firing in an inert gas atmosphere.

($H_2$ Consumption)

The $H_2$ consumption of the oxygen storage materials of Examples 1 and 10 and Comparative Examples 1 and 4 was measured by the $H_2$-TPR (Temperature Programmed Reduction) method.

The conditions for the measurement of $H_2$ consumption by the $H_2$-TPR method are as follows.

Measurement apparatus: Catalyst analysis apparatus, BEL-CAT, manufactured by BEL Japan, Inc.

Measurement method: Temperature Programmed Desorption measurement (TPD)

Measurement cell: Chemisorption amount measurement cell

Gas flow rate: 60 mL/min

Detection method:
  a) Thermal conductivity detector (TPD)
  b) Quadrupole mass analyzer (MS: Mass Spectrometry)
     Detection system: Faraday cup/secondary electron multiplier
     Detection limit: 1 ppm
     Gas introduction amount: about 1.0 mL/min (1 atm.)
     Measured mass number: m/z; 2 ($H_2$), m/z: 40 (Ar), 18 ($H_2O$)

Measurement conditions:

| 1) | Room temperature to 500° C. | flow of 10% $O_2$/Ar gas (temperature rise at 10° C./min) |
| 2) | 500° C. | flow of 10% $O_2$/Ar gas (holding for 10 minutes) |
| 3) | 500 to 40° C. | flow of 10% $O_2$/Ar gas |
| 4) | 40° C. | flow of Ar gas (holding for 30 minutes) |
| 5) | 40 to 950° C. | flow of 5% $H_2$/Ar gas (temperature rise rate: 10° C./min) |
| 6) | 950° C. | flow or 5% $H_2$/Ar gas (holding for 20 minutes) |
| 7) | 950 to 40° C. | flow of Ar gas |

As shown in Table 6, the Ce content in the oxygen storage material differs between Examples 1 and 10 and Comparative Examples 1 and 4, and therefore the $H_2$ consumption was normalized by the Ce content and determined as $H_2$ consumption per unit Ce mass %.

TABLE 6

| | Ce Content (mass %) | |
| --- | --- | --- |
| | Charge Amount | Chemical Analysis Value |
| Examples 1 and 10 | 11.4 | 11.1 |
| Comparative Examples 1 and 4 | 16.9 | 16.6 |

Figure 11A:
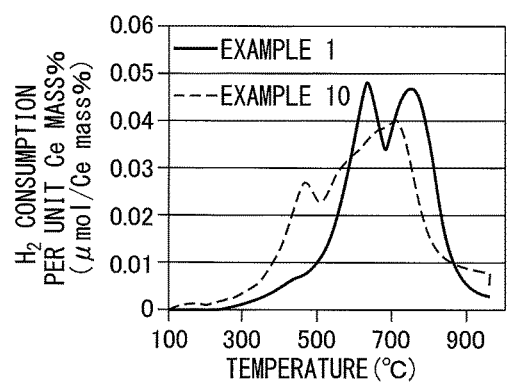
[FIG. 11A] A view illustrating the $H_2$ consumption profile per unit Ce mass % in the oxygen storage materials of Examples 1 and 10.
Figure 11B:
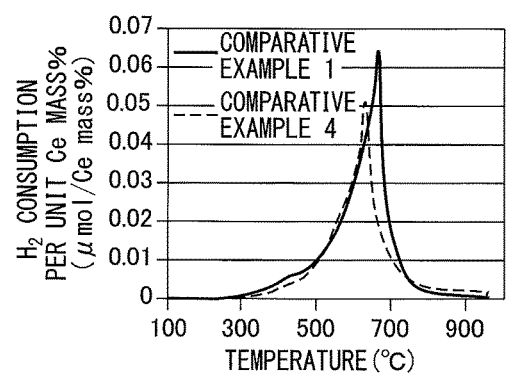
[FIG. 11B] A view illustrating the $H_2$ consumption profile per unit Ce mass % in the oxygen storage materials of Comparative Examples 1 and 4.

FIGS. 11A and 11B illustrate the measurement results. FIG. 11A is a view illustrating the $H_2$ consumption profile per unit Ce mass % in the oxygen storage materials of Examples 1 and 10. FIG. 11B is a view illustrating the $H_2$ consumption profile per unit Ce mass % in the oxygen storage materials of Comparative Examples 1 and 4. The measurement was performed using both the thermal conductivity detector (TPD) and the quadrupole mass analyzer (MS), but there was observed substantially no difference in the results between these two measurements, and therefore the results of the measurement performed using the thermal conductivity detector (TPD) are shown.

Figure 12:
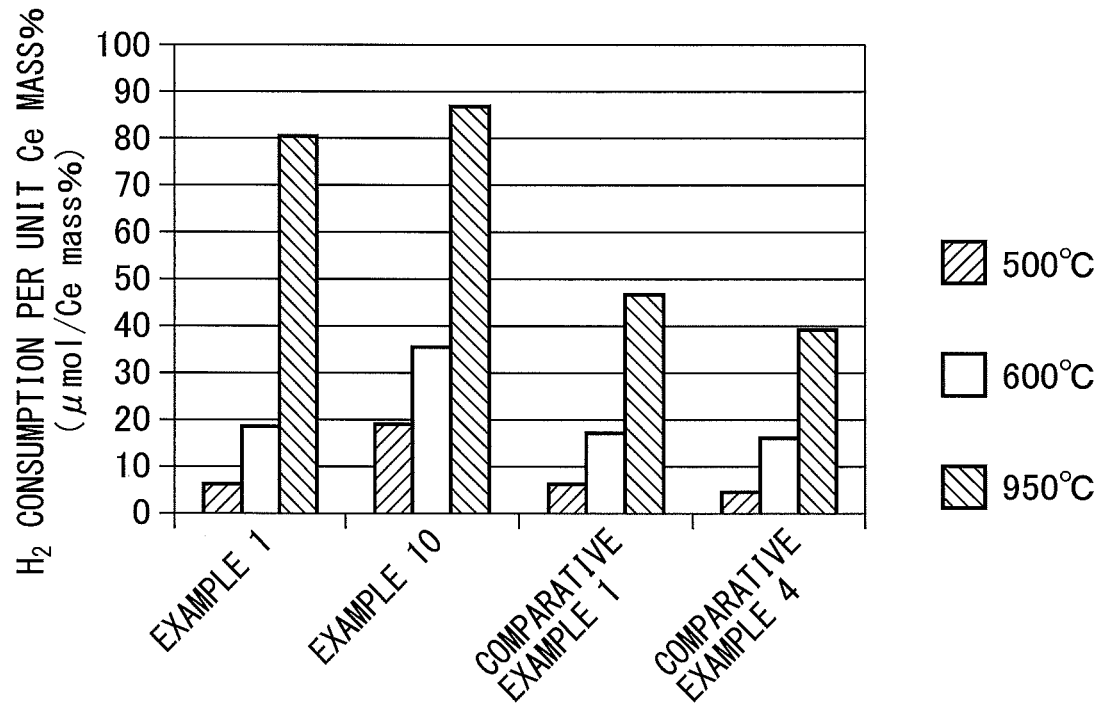
[FIG. 12] A graph illustrating the $H_2$ consumption per unit Ce mass % in the oxygen storage materials of Examples 1 and 10 and Comparative Examples 1 and 4.

FIG. 12 is a graph illustrating the $H_2$ consumption per unit Ce mass % in the oxygen storage materials of Examples 1 and 10 and Comparative Examples 1 and 4.

As shown in FIGS. 11A, 11B and 12, in Example 1, the $H_2$ consumption is increased only at room temperature to 950° C., whereas in Example 10, the $H_2$ consumption is increased at room temperature to 500° C. and also at room temperature to 600° C. Thus, it could be confirmed that the oxygen storage material of Example 10 is excellent in the oxygen storage capacity at low-to-medium temperature as well as at high temperature.

This was achieved because in Example 10, the oxygen storage material of Example 1 is subjected to a re-oxidizing heat treatment and the nano-level particles aggregated without any space are divided thereby. Here, the particles indicates the ceria-zirconia-based regular array phase and the aluminate-based composite oxide which are mutually dispersed.

The $H_2$ consumption measurement was performed in the same manner also on the oxygen storage materials other than Examples 1 and 10 and Comparative Examples 1 and 4, and various discussions were made thereon. Incidentally, the Ce content differs among respective oxygen storage materials, and therefore unless otherwise indicated, discussions were made with respect to the $H_2$ consumption normalized by the Ce content ($H_2$ consumption per unit Ce mass %).

Figure 13:
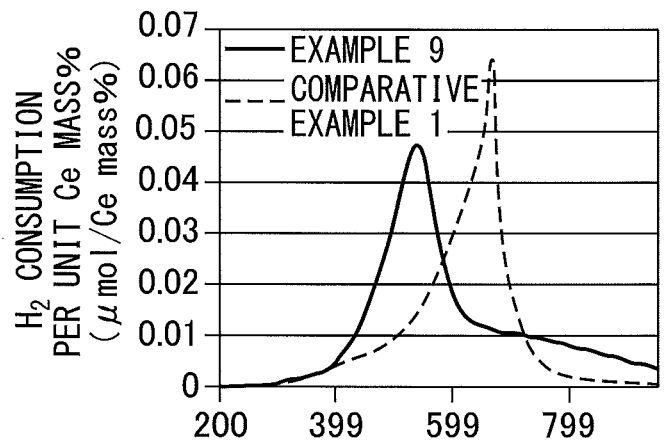
[FIG. 13] A view illustrating the $H_2$ consumption profile per unit Ce mass % in the oxygen storage materials of Example 9 and Comparative Example 1.
Figure 14:
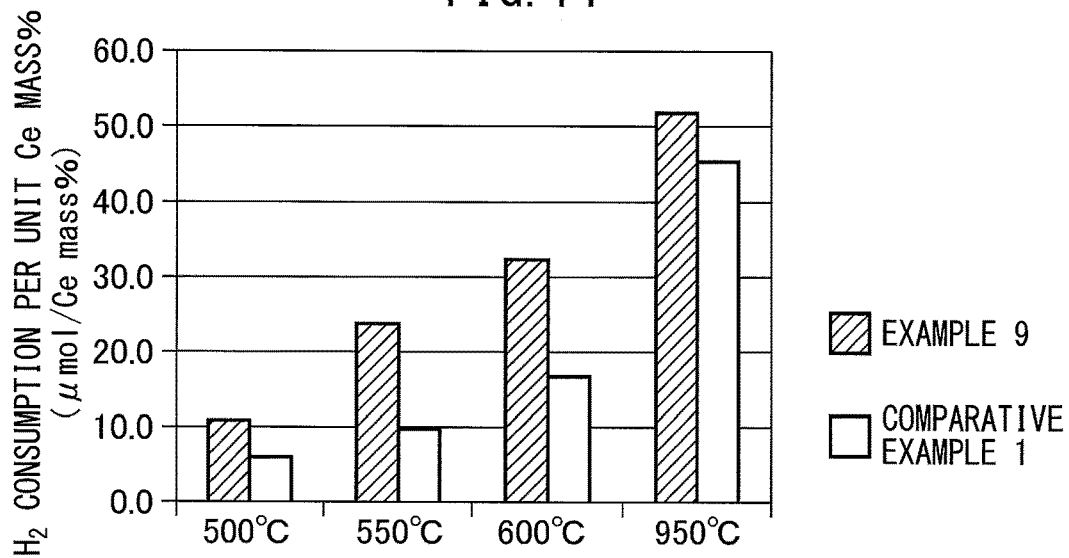
[FIG. 14] A graph illustrating the $H_2$ consumption profile per unit Ce mass % for each temperature in the oxygen storage materials of Example 9 and Comparative Example 1.

FIG. 13 is a view illustrating the $H_2$ consumption profile per unit Ce mass % in the oxygen storage materials of Example 9 and Comparative Example 1. FIG. 14 is a graph illustrating the $H_2$ consumption profile per unit Ce mass % for each temperature in the oxygen storage materials of Example 9 and Comparative Example 1.

As shown in FIGS. 13 and 14, compared with Comparative Example 1, the $H_2$ consumption from low temperature to high temperature is large in Example 9. In particular, the $H_2$ consumption in the low-to-medium temperature region in Example 9 was as large as about 2 times that in Comparative Example 1. Thus, it could be confirmed that the oxygen storage material of Example 9 is excellent in the oxygen storage capacity over a region from low temperature to high temperature.

Figure 15:
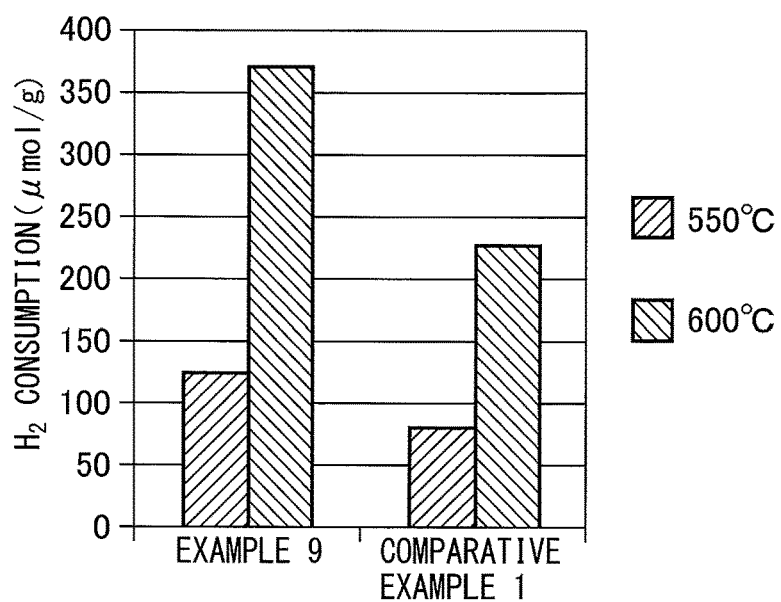
[FIG. 15] A graph illustrating the $H_2$ consumption in Examples 1 and 9.

FIG. 15 is a graph illustrating the $H_2$ consumption in the oxygen storage materials of Examples 1 and 9.

As shown in FIG. 15, the $H_2$ consumption of the oxygen storage material of Example 9 is larger than that of Example 1. This is achieved because as under stood from Table 5, the specific surface area of the oxygen storage material of Example 9 is larger than that of Example 1. The reason why the specific surface area of the oxygen storage material of Example 9 is larger is as described above regarding Table 5.

Figure 16:
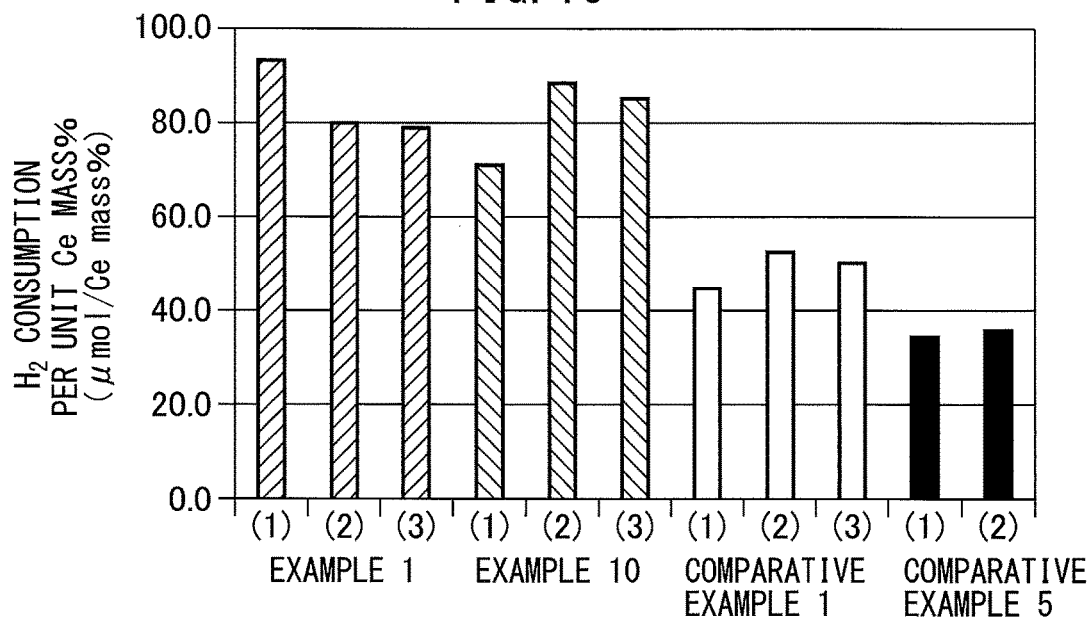
[FIG. 16] A graph illustrating the results in respective measurements when the $H_2$ consumption at room temperature to 950° C. of each oxygen storage material is measured three times.

FIG. 16 is a graph illustrating the results in respective measurement results when the $H_2$ consumption at room temperature to 950° C. of each oxygen storage material is measured three times.

As shown in FIG. 16, the $H_2$ consumption of the oxygen storage materials of Examples 1 and 10 varies little, and it is confirmed that the reproducibility could be ensured.

Figure 17:
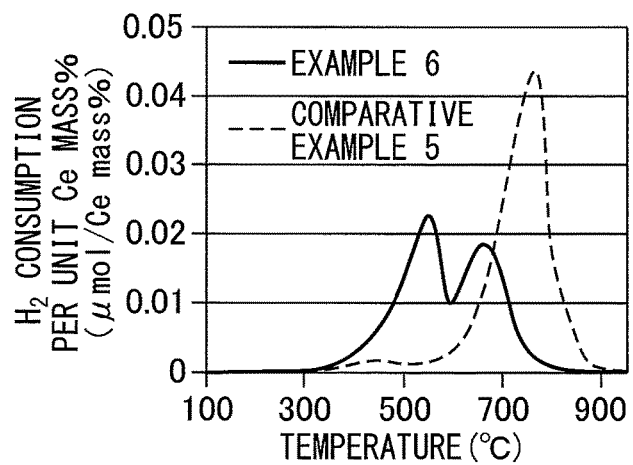
[FIG. 17] A view illustrating the $H_2$ consumption profile per unit Ce mass % in the oxygen storage materials of Example 6 and Comparative Example 5.

FIG. 17 is a view illustrating the $H_2$ consumption profile per unit Ce mass % in the oxygen storage materials of Example 6 and Comparative Example 5.

As shown in FIG. 17, compared with the oxygen storage material of Comparative Example 5, the $H_2$ consumption at low-to-medium temperature is large in the oxygen storage material of Example 6. This is achieved because, as described hereinbefore, the ceria-zirconia-based regular array phase and the aluminate-based composite oxide phase are mutually dispersed at the nano-level in the oxygen storage material of Example 6. on the other hand, in Comparative Example 5, carbon is used only to reduce oxygen in the heat treatment atmosphere and the carbon does not contribute to mutual dispersion at the nano-level of the ceria-zirconia-based regular array phase and the aluminate-based composite oxide.

Figure 18:
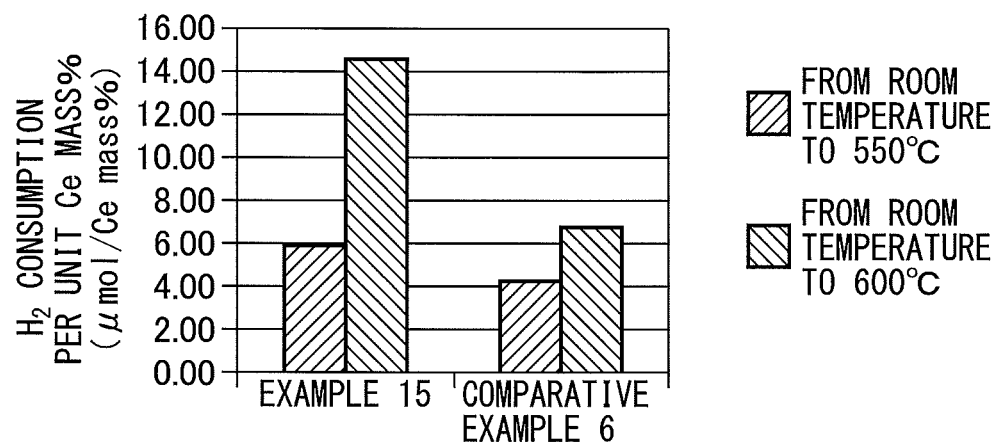
[FIG. 18] A view illustrating the $H_2$ consumption profile per unit Ce mass % in the oxygen storage materials of Example 15 and Comparative Example 6.

FIG. 18 is a view illustrating the $H_2$ consumption profile per unit Ce mass % in the oxygen storage materials of Example 15 and Comparative Example 6.

As shown in FIG. 18, the oxygen storage material of Example 15 is larger in the $H_2$ consumption at low-to-medium temperature than the oxygen storage material of Comparative Example 6. Example 15 is an oxygen storage material obtained through a reducing heat treatment at 1,300° C. It was confirmed from this result that even when the reducing heat treatment temperature is 1,300° C., an oxygen storage material in which the ceria-zirconia-based regular array phase and the aluminate-based composite oxide phase are mutually dispersed at the nano-level is obtained.

Figure 19:
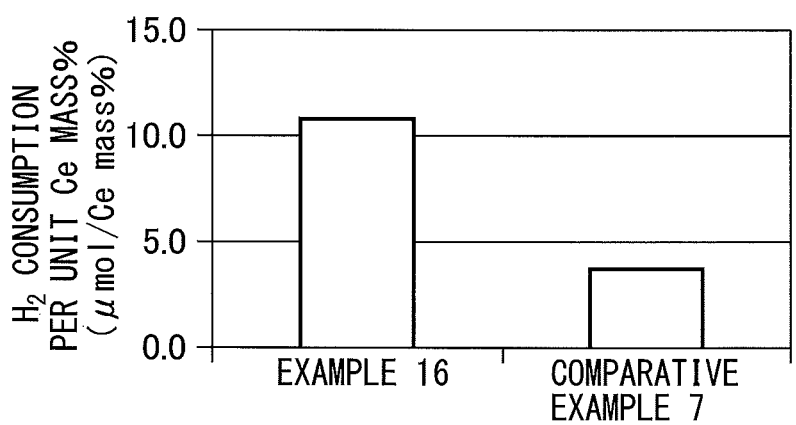
[FIG. 19] A graph illustrating the $H_2$ consumption per unit Ce mass % at 400° C. of the exhaust gas purification catalysts of Example 16 and Comparative Example 7.

FIG. 19 is a graph illustrating the $H_2$ consumption per unit Ce mass % at 400° C. of the exhaust gas purification catalysts of Example 16 and Comparative Example 7.

As shown in FIG. 19, with respect to the $H_2$ consumption per unit Ce mass % at 400° C. of the exhaust gas purification catalyst, Example 16 surpassed Comparative Example 7. It is confirmed from this result that the oxygen storage material of the present invention can be used by supporting a catalytic metal thereon.

From the results described in the foregoing pages, the effects of the present invention could be confirmed.

DESCRIPTION OF NUMERICAL REFERENCES

1 Ceria-zirconia-based regular array phase
1a κ Phase
1b Pyrochlore phase
2 Aluminate-based composite oxide

The invention claimed is:
1. A production method of an oxygen storage material, comprising:
adding a hydroxycarboxylic acid to an aqueous solution containing a water-soluble cerium salt, a water-soluble zirconium salt, a water-soluble aluminum salt, and at least one selected from a water-soluble lanthanum salt, a water-soluble magnesium salt, and a water-soluble calcium salt, to produce a gel, heating the gel to obtain a solid product resulting from decomposition of the salts, firing the solid product to obtain a fired product containing a ceria-zirconia-based regular array phase precursor and an aluminate-based composite oxide precursor, performing a reducing heat treatment of the fired product to obtain a first composite having mutually dispersed therein a pyrochlore phase and an aluminate-based composite oxide, and performing an oxidizing heat treatment of the first composite to obtain a second composite in which at least part of the pyrochlore phase is transformed into a κ phase.

2. The production method of an oxygen storage material according to claim 1, wherein the firing of a solid product comprises:

preliminary firing the solid product at a temperature allowing an inorganic material in the solid product to remain, thereby obtaining a preliminary fired product, and re-firing the preliminary fired product in an inert gas atmosphere to obtain a re-fired product containing a ceria-zirconia-based regular array phase precursor, an aluminate-based composite oxide precursor, and a carbide derived from the organic material, followed by subjecting the re-fired product to the reducing heat treatment.

3. The production method of an oxygen storage material according to claim 1, wherein the reducing heat treatment comprises:

adding a hydroxycarboxylic acid and water to the fired product to obtain a mixed solution, drying the mixed solution to obtain a dried body, calcining the dried body at a temperature allowing an inorganic material in the dried body to remain, thereby obtaining a calcined product, and re-firing the calcined product in an inert gas atmosphere to obtain a fired product containing the ceria-zirconia-based regular array phase precursor, the aluminate-based composite oxide precursor, and the organic material-derived carbide.

4. The production method of an oxygen storage material according to claim 1, wherein a re-oxidizing heat treatment is further performed after the oxidizing heat treatment.

5. The production method of an oxygen storage material according to claim 1, wherein the salt is a nitrate.

6. The production method of an oxygen storage material according to claim 1, wherein the hydroxycarboxylic acid is a citric acid.

7. The production method of an oxygen storage material according to claim 1, further comprising supporting one or more metals selected from ruthenium, rhodium, palladium, osmium, iridium, platinum, gold, copper, iron and nickel on the second composite.

* * * * *